US012715808B2

(12) United States Patent
Mofid et al.

(10) Patent No.: US 12,715,808 B2
(45) Date of Patent: Aug. 25, 2026

(54) SMART COATINGS

(71) Applicant: University of Central Florida Research Foundation, Inc., Orlando, FL (US)

(72) Inventors: Sohrab Mofid, Orlando, FL (US); Lei Zhai, Orlando, FL (US); David Fox, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 262 days.

(21) Appl. No.: 18/386,200

(22) Filed: Nov. 1, 2023

(65) Prior Publication Data

US 2024/0140858 A1 May 2, 2024

Related U.S. Application Data

(60) Provisional application No. 63/381,928, filed on Nov. 1, 2022.

(51) Int. Cl.
*C03C 17/00* (2006.01)
*C03C 17/42* (2006.01)

(52) U.S. Cl.
CPC ............ *C03C 17/007* (2013.01); *C03C 17/42* (2013.01); *C03C 2217/228* (2013.01); *C03C 2217/445* (2013.01); *C03C 2217/475* (2013.01); *C03C 2217/70* (2013.01); *C03C 2218/115* (2013.01)

(58) Field of Classification Search
None
See application file for complete search history.

(56) References Cited

U.S. PATENT DOCUMENTS

| | | | | |
|---|---|---|---|---|
| 2015/0203398 A1* | 7/2015 | Meyer | C23C 14/34 428/472 |
| 2015/0306848 A1* | 10/2015 | Anderson | B32B 17/10137 428/501 |

OTHER PUBLICATIONS

Lu et al., Transparent optically vanadium dioxide thermochromic smart film fabricated via electrospinning technique, Applied Surface Science, vol. 425, 2017, pp. 233-240 (Year: 2017).*

M. Saeli, C. Piccirillo, I.P. Parkin, I. Ridley, R. Binions, "Nano-composite thermochromic thin films and their application in energy-efficient glazing," Solar Energy Materials and Solar Cells 94(2) (2010) 141-151.

M. Kamalisarvestani, R. Saidur, S. Mekhilef, F. Javadi, "Performance, materials and coating technologies of thermochromic thin films on smart windows," Renewable and Sustainable Energy Reviews 26 (2013) 353-364.

Y. Ke, C. Zhou, Y. Zhou, S. Wang, S.H. Chan, Y. Long, "Emerging thermal-responsive materials and integrated techniques targeting the energy-efficient smart window application," Advanced Functional Materials 28(22) (2018) 1800113.

Y. Ke, Y. Yin, Q. Zhang, Y. Tan, P. Hu, S. Wang, Y. Tang, Y. Zhou, X. Wen, S. Wu, "Adaptive thermochromic windows from active plasmonic elastomers," Joule 3(3) (2019) 858-871.

H. Kim, Y. Kim, K.S. Kim, H.Y. Jeong, A.-R. Jang, S.H. Han, D.H. Yoon, K.S. Suh, H.S. Shin, T. Kim, "Flexible thermochromic window based on hybridized VO2/graphene", ACS Nano 7(7) (2013) 5769-5776.

Y. Chen, X. Zeng, J. Zhu, R. Li, H. Yao, X. Cao, S. Ji, P. Jin, "High performance and enhanced durability of thermochromic films using VO2@ ZnO core-shell nanoparticles", ACS Applied Materials & Interfaces 9(33) (2017) 27784-27791.

Y. Cui, Y. Ke, C. Liu, Z. Chen, N. Wang, L. Zhang, Y. Zhou, S. Wang, Y. Gao, Y. Long, "Thermochromic VO2 for energy-efficient smart windows", Joule 2(9) (2018) 1707-1746.

J. Schläefer, C. Sol, T. Li, D. Malarde, M. Portnoi, T.J. Macdonald, S.K. Laney, M.J. Powell, I. Top, I.P. Parkin, "Thermochromic VO2-SiO2 nanocomposite smart window coatings with narrow phase transition hysteresis and transition gradient width," Solar Energy Materials and Solar Cells 200 (2019) 109944.

X. Zhao, X. Hu, J. Sun, Q. You, H. Xu, W. Liu, G. Sun, Y. Nie, W. Yao, X. Jiang, "VO2-based composite films with exemplary thermochromic and photochromic performance," Journal of Applied Physics 128(18) (2020) 185107.

X. Zhao, S. Mofid, T. Gao, G. Tan, B. Jelle, X. Yin, R. Yang, "Durability-enhanced vanadium dioxide thermochromic film for smart windows," Materials Today Physics 13 (2020) 100205.

M. Aburas, V. Soebarto, T. Williamson, R. Liang, H. Ebendorff-Heidepriem, Y. Wu, "Thermochromic smart window technologies for building application: A review," Applied Energy 255 (2019) 113522.

J. Zhou, Y. Gao, X. Liu, Z. Chen, L. Dai, C. Cao, H. Luo, M. Kanahira, C. Sun, L. Yan, "Mg-doped VO2 nanoparticles: hydrothermal synthesis, enhanced visible transmittance and decreased metal-insulator transition temperature," Physical Chemistry Chemical Physics 15(20) (2013) 7505-7511.

(Continued)

*Primary Examiner* — Cheng Yuan Huang
(74) *Attorney, Agent, or Firm* — Troutman Pepper Locke LLP; Gabrielle L. Gelozin
(74) *Attorney, Agent, or Firm* — S. Liang, Q. Shi, H. Zhu, B. Peng, W. Huang, "One-step hydrothermal synthesis of W-doped VO2 (M) nanorods with a tunable phase-transition temperature for infrared smart windows," ACS Omega 1(6) (2016) 1139-1148.
(74) *Attorney, Agent, or Firm* — D. Zomaya, W.Z. Xu, B. Grohe, S. Mittler, P.A. Charpentier, "W-doped VO2/PVP coatings with enhanced thermochromic performance," Solar Energy Materials and Solar Cells 200 (2019) 109900.

(57) ABSTRACT

In accordance with at least one aspect of this disclosure, a thermochromic window can include a first transparent layer, a second transparent layer, and a thermochromic fiber layer sandwiched between the first transparent layer and the second transparent layer. In certain embodiments, the thermochromic fiber layer may be embedded in the second transparent layer. The thermochromic window can be configured to selectively absorb or reflect infrared radiation (IR) as a function of a critical temperature.

14 Claims, 10 Drawing Sheets

(56) References Cited

OTHER PUBLICATIONS

W. Zeng, N. Chen, W. Xie, "Research progress on the preparation methods for VO2 nanoparticles and their application in smart windows," CrystEngComm 22(5) (2020) 851-869.
T.D. Manning, I.P. Parkin, M.E. Pemble, D. Sheel, D. Vernardou, "Intelligent window coatings: atmospheric pressure chemical vapor deposition of tungsten-doped vanadium dioxide," Chemistry of Materials 16(4) (2004) 744-749.
D. Kim, H.S. Kwok, "Pulsed laser deposition of VO2 thin films," Applied Physics Letters 65(25) (1994) 3188-3190.
D.-p. Zhang, M.-d. Zhu, Y. Liu, K. Yang, G.-x. Liang, Z.-h. Zheng, X.-m. Cai, P. Fan, "High performance VO2 thin films growth by DC magnetron sputtering at low temperature for smart energy efficient window application," Journal of Alloys and Compounds 659 (2016) 198-202.
S.-D. Lan, C.-C. Cheng, C.-H. Huang, J.-K. Chen, "synthesis of sub-10 nm VO2 nanoparticles films with plasma-treated glass slides by aqueous sol-gel method," Applied Surface Science 357 (2015) 2069-2076.
S. Ding, Z. Liu, D. Li, W. Zhao, Y. Wang, D. Wan, F. Huang, "Tunable assembly of vanadium dioxide nanoparticles to create porous film for energy-saving applications," ACS Applied Materials & Interfaces 5(5) (2013) 1630-1635.
Z. Chen, Y. Gao, L. Kang, C. Cao, S. Chen, H. Luo, "Fine crystalline VO2 nanoparticles: synthesis, abnormal phase transition temperatures and excellent optical properties of a derived VO2 nanocomposite foil," Journal of Materials Chemistry A 2(8) (2014) 2718-2727.
Y. Gao, S. Wang, H. Luo, L. Dai, C. Cao, Y. Liu, Z. Chen, M. Kanehira, "Enhanced chemical stability of VO2 nanoparticles by the formation of SiO2/VO2 core/shell structures and the application to transparent and flexible VO2-based composite foils with excellent thermochromic properties for solar heat control," Energy & Environmental Science 5(3) (2012) 6104-6110.
Y.-X. Ji, S.-Y. Li, G.A. Niklasson, C.G. Granqvist, Durability of thermochromic VO2 thin films under heating and humidity: Effect of AI oxide top coatings, Thin Solid Films 562 (2014) 568-573.
T. Chang, X. Cao, L.R. Dedon, S. Long, A. Huang, Z. Shao, N. Li, H. Luo, P. Jin, "Optical design and stability study for ultrahigh-performance and long-lived vanadium dioxide-based thermochromic coatings," Nano Energy 44 (2018) 256-264.
R. Lindstrom, V. Maurice, S. Zanna, L. Klein, H. Groult, L. Perrigaud, C. Cohen, P. Marcus, "Thin films of vanadium oxide grown on vanadium metal: oxidation conditions to produce V2O5 films for Li?intercalation applications and characterisation by XPS, AFM, RBS/NRA," Surface and Interface Analysis: An International Journal devoted to the development and application of techniques for the analysis of surfaces, interfaces and thin films 38(1) (2006) 6-18.
K. Tong, R. Li, J. Zhu, H. Yao, H. Zhou, X. Zeng, S. Ji, P. Jin, "Preparation of VO2/AI-O core-shell structure with enhanced weathering resistance for smart window," Ceramics International 43(5) (2017) 4055-4061.
Y. Li, S. Ji, Y. Gao, H. Luo, M. Kanehira, "Core-shell VO 2@ TiO 2 nanorods that combine thermochromic and photocatalytic properties for application as energy-saving smart coatings," Scientific reports 3 (2013) 1370.
R. Li, S. Ji, Y. Li, Y. Gao, H. Luo, P. Jin, "Synthesis and characterization of plate-like VO2 (M)@ SiO2 nanoparticles and their application to smart window," Materials Letters 110 (2013) 241-244.
S. Zhao, Y. Tao, Y. Chen, Y. Zhou, R. Li, L. Xie, A. Huang, P. Jin, S. Ji, "Room-Temperature Synthesis of Inorganic-Organic Hybrid Coated VO2 Nanoparticles for Enhanced Durability and Flexible Temperature-Responsive Near-Infrared Modulator Application," ACS Applied Materials & Interfaces 11(10) (2019) 10254-10261.
T. Chang, X. Cao, N. Li, S. Long, X. Gao, L.R. Dedon, G. Sun, H. Luo, P. Jin, "Facile and low-temperature fabrication of thermochromic Cr2O3/VO2 smart coatings: enhanced solar modulation ability, high luminous transmittance and UV-shielding function," ACS Applied Materials & Interfaces 9(31) (2017) 26029-26037.
S. Long, X. Cao, N. Li, Y. Xin, G. Sun, T. Chang, S. Bao, P. Jin, "Application-oriented VO2 thermochromic coatings with composite structures: Optimized optical performance and robust fatigue properties," Solar Energy Materials and Solar Cells 189 (2019) 138-148.
A. Huang, Y. Zhou, Y. Li, S. Ji, H. Luo, P. Jin, "Preparation of V x W 1? x O 2 (M)@ SiO 2 ultrathin nanostructures with high optical performance and optimization for smart windows by etching," Journal of Materials Chemistry A 1(40) (2013) 12545-12552.
Y. Xie, X. Zhao, S.A. Mofid, J. Tan, B.P. Jelle, R. Yang, "Influence of Shell Materials on the Optical Performance of VO2 Core-Shell Nanoparticle-Based Thermochromic Films," Materials Today Nano (2020) 100102.
T.D. Vu, Z. Chen, X. Zeng, M. Jiang, S. Liu, Y. Gao, Y. Long, "Physical vapour deposition of vanadium dioxide for thermochromic smart window applications," Journal of Materials Chemistry C 7(8) (2019) 2121-2145.
Y. Gao, H. Luo, Z. Zhang, L. Kang, Z. Chen, J. Du, M. Kanehira, C. Cao, "Nanoceramic VO2 thermochromic smart glass: A review on progress in solution processing," Nano Energy 1(2) (2012) 221-246.
A.A. Tracton, "Coatings technology handbook," CRC press2005.
Z. Chen, Y. Tang, A. Ji, L. Zhang, Y. Gao, "Large-scale preparation of durable VO2 nanocomposite coatings," ACS Applied Nano Materials 4(4) (2021) 4048-4054.
M. Bognitzki, W. Czado, T. Frese, A. Schaper, M. Hellwig, M. Steinhart, A. Greiner, J.H. Wendorff, "Nanostructured fibers via electrospinning," Advanced materials 13(1) (2001) 70-72.
D.H. Reneker, A.L. Yarin, "Electrospinning jets and polymer nanofibers," Polymer 49(10) (2008) 2387-2425.
M. Li, S. Magdassi, Y. Gao, Y. Long, "Hydrothermal synthesis of VO2 polymorphs: advantages, challenges and prospects for the application of energy efficient smart windows," Small 13(36) (2017) 1701147.
A. Baldan, "Review Progress in Ostwald ripening theories and their applications to nickel-base superalloys Part I: Ostwald ripening theories," Journal of Materials Science 37(11) (2002) 2171-2202.
Y.-S. Chen, H.-C. Ho, Y.-C. Lai, T. Nagao, C.-H. Hsueh, "Thermochromic vanadium dioxide film on textured silica substrate for smart window with enhanced visible transmittance and tunable infrared radiation," Infrared Physics & Technology 102 (2019) 103019.
Y. Ke, X. Wen, D. Zhao, R. Che, Q. Xiong, Y. Long, "Controllable fabrication of two-dimensional patterned VO2 nanoparticle, nanodome, and nanonet arrays with tunable temperature-dependent localized surface plasmon resonance," ACS Nano 11(7) (2017) 7542-7551.
Intertronics, "Opti-tec 5012 Low Viscosity, Clear Epoxy Adhesive / Encapsulant," (2021).
X. Cao, T. Chang, Z. Shao, F. Xu, H. Luo, P. Jin, "Challenges and opportunities toward real application of VO2-based smart glazing," Matter 2(4) (2020) 862-881.
H. Zargar, P. Zarei, D. Wong, C. Lam, E. Asselin, "Transport of water and oxygen in epoxy-based coatings," (2022).
L. Farber, Chapter 2—"Microstructure and Mechanical Properties of Granules Formed in High Shear Wet Granulation, in: A.S. Narang, S.I.F. Badawy (Eds.), Handbook of Pharmaceutical Wet Granulation," Academic Press 2019, pp. 37-88.
J. Zhu, Y. Zhou, B. Wang, J. Zheng, S. Ji, H. Yao, H. Luo, P. Jin, "Vanadium dioxide nanoparticle-based thermochromic smart coating: high luminous transmittance, excellent solar regulation efficiency, and near room temperature phase transition," ACS Applied Materials & Interfaces 7(50) (2015) 27796-27803.
ARPA-E, Single-pan highly insulating effcient lucid designs (SHIELD)—Program Overview, ARPA-E, (2014).
X. Zhao, S.A. Mofid, B.P. Jelle, G. Tan, X. Yin, R. Yang, "Optically-switchable thermally-insulating VO2-aerogel hybrid film for window retrofits," Applied Energy 278 (2020) 115663.
X. Zhao, S.A. Mofid, M.R. Al Hulayel, G.W. Saxe, B.P. Jelle, R. Yang, "Reduced-scale hot box method for thermal characterization of window insulation materials," Applied Thermal Engineering 160 (2019) 114026.

(56) References Cited

OTHER PUBLICATIONS

R. Garber-Slaght, C. Craven, "Evaluating window insulation for cold climates," Journal of Green Building 7(3) (2012) 32-48.
G. Cellai, C. Carletti, F. Sciurpi, S. Secchi, "Transparent building envelope: windows and shading devices typologies for energy efficiency refurbishments, Building refurbishment for energy performance," Springer2014, pp. 61-118.
S.A. Mofid, "Synthesis, Modeling and Characterization of Thermally Insulating and Optically Switchable Nanostructured Materials for Energy Efficiency Building Applications," Norwegian University of Science and Technology (2020).
X. Zhao, "Thermal and Optical Management of Windows with Nanoengineered Transparent Insulation Materials," University of Colorado at Boulder, 2020.
M. Deru, K. Field, D. Studer, K. Benne, B. Griffith, P. Torcellini, B. Liu, M. Halverson, D. Winiarski, M. Rosenberg, "US Department of Energy commercial reference building models of the national building stock," (2011).
A. Standard, 169, 2013."Climate Data for Building Design Standards," 1791 Tullie Circle NE• Atlanta, GA 30329.
W. Li, S. Ji, Y. Li, A. Huang, H. Luo, P. Jin, "Synthesis of VO 2 nanoparticles by a hydrothermal-assisted homogeneous precipitation approach for thermochromic applications," Rsc Advances 4(25) (2014) 13026-13033.
Z. Cao, X. Xiao, X. Lu, Y. Zhan, H. Cheng, G. Xu, "A simple and low-cost combustion method to prepare monoclinic VO2 with superior thermochromic properties," Scientific reports 6(1) (2016) 1-9.
C. Riordan, R. Hulstron, "What is an air mass 1.5 spectrum? (Solar cell performance calculations)," IEEE Conference on Photovoltaic Specialists, IEEE, 1990, pp. 1085-1088.
D.B. Crawley, L.K. Lawrie, F.C. Winkelmann, W.F. Buhl, Y.J. Huang, C.O. Pedersen, R.K. Strand, R.J. Liesen, D.E. Fisher, M.J. Witte, EnergyPlus: creating a new-generation building energy simulation program, Energy and buildings 33(4) (2001) 319-331.
G.N. Walton, Thermal analysis research program reference manual, US Department of Commerce, National Bureau of Standards Washington, DC, USA1983.
U.S. Department of Energy, "EnergyPlus Input output reference," EnergyPlusTM Version 9.6.0. Documentation (2010).
W. Marion, K. Urban, "User's manual for TMY2's: Derived from the 1961-1990 national solar radiation data base," Nasa Sti/recon Technical Report N 96 (1995) 11274.
M. Deru, P. Torcellini, "Source Energy and Emission Factors for Energy Use in Buildings (Revised)," National Renewable Energy Lab.(NREL), Golden, CO (United States), 2007.
D. Guo, C. Ling, C. Wang, D. Wang, J. Li, Z. Zhao, Z. Wang, Y. Zhao, J. Zhang, H. Jin, Hydrothermal one-step synthesis of highly dispersed M-Phase VO2 nanocrystals and application to flexible thermochromic film, ACS applied materials & interfaces 10(34) (2018) 28627-28634.

* cited by examiner

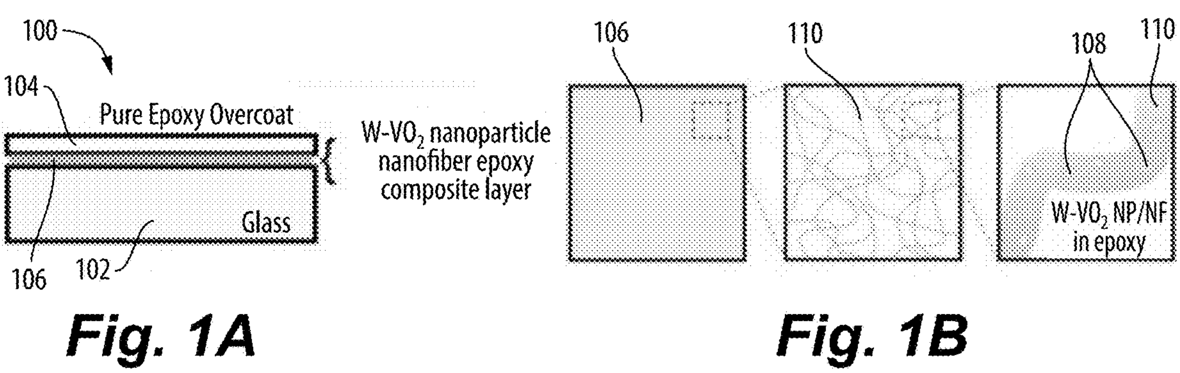
Fig. 1A
Fig. 1B
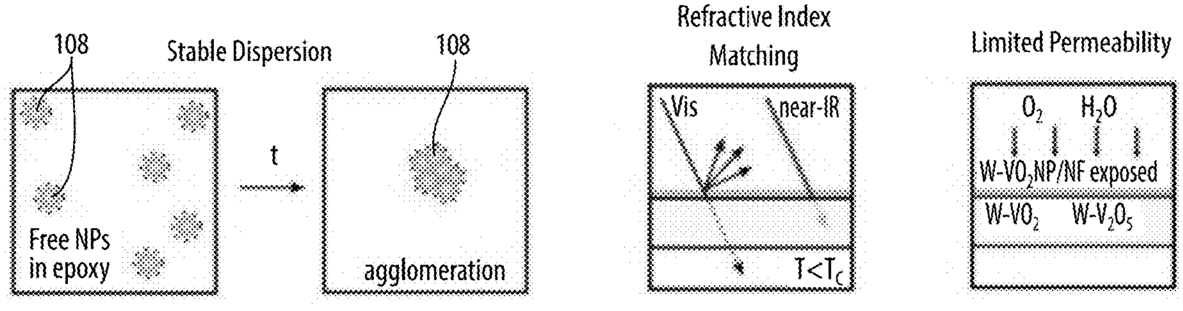
Fig. 1C-1
Fig. 1D-1
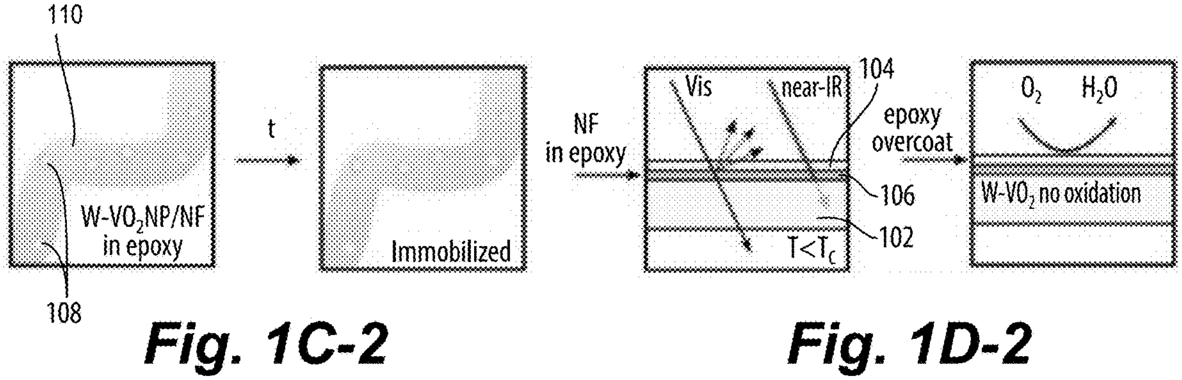
Fig. 1C-2
Fig. 1D-2

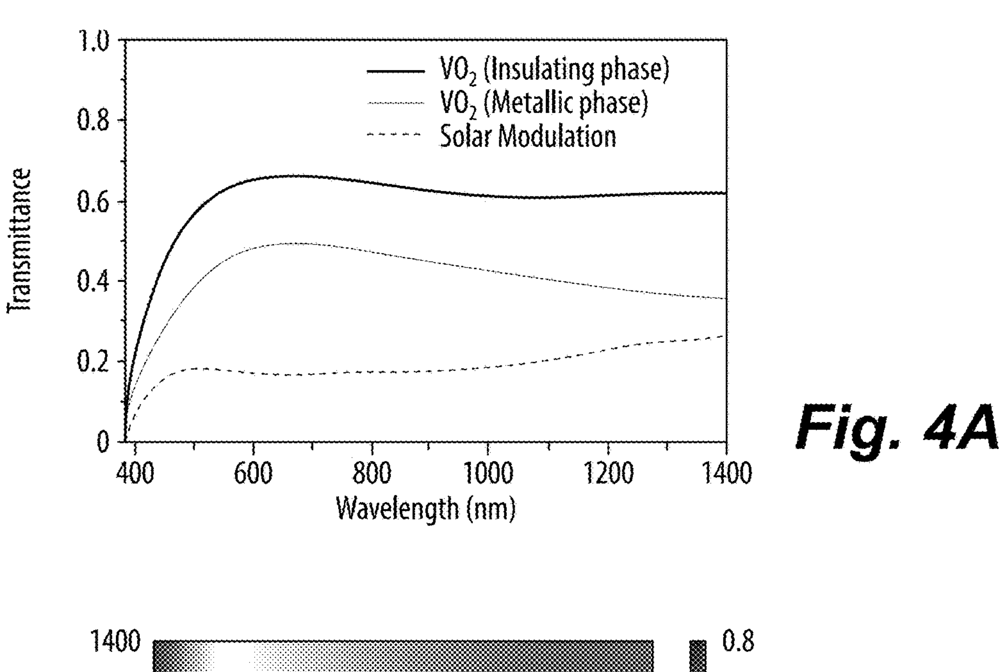
Fig. 4A
1400
1200
1000
800
600
400
Wavelength (nm)
0.2
0.4
0.6
0.8
Volume Ratio (%)
0.8
0.7
0.6
0.5
0.4
0.3
0.2
Fig. 4B
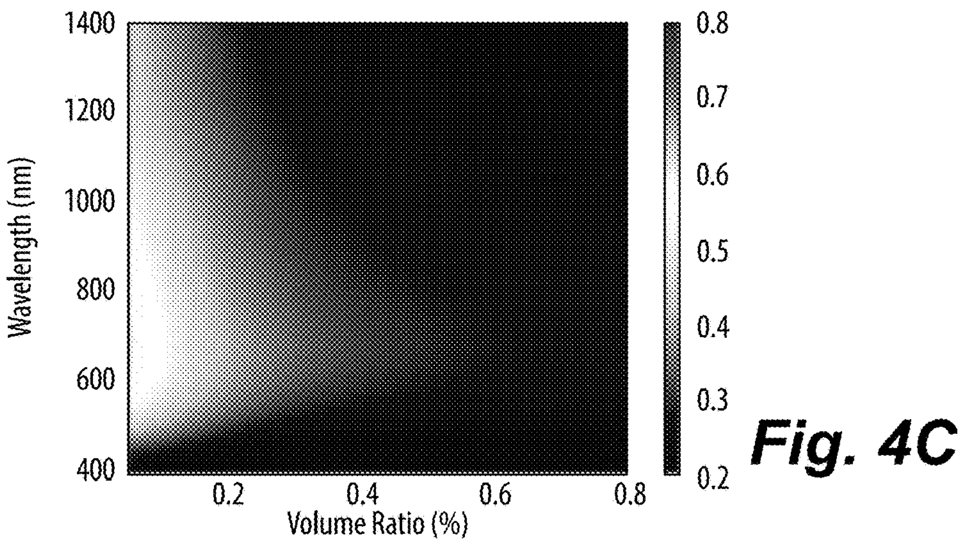
Fig. 4C

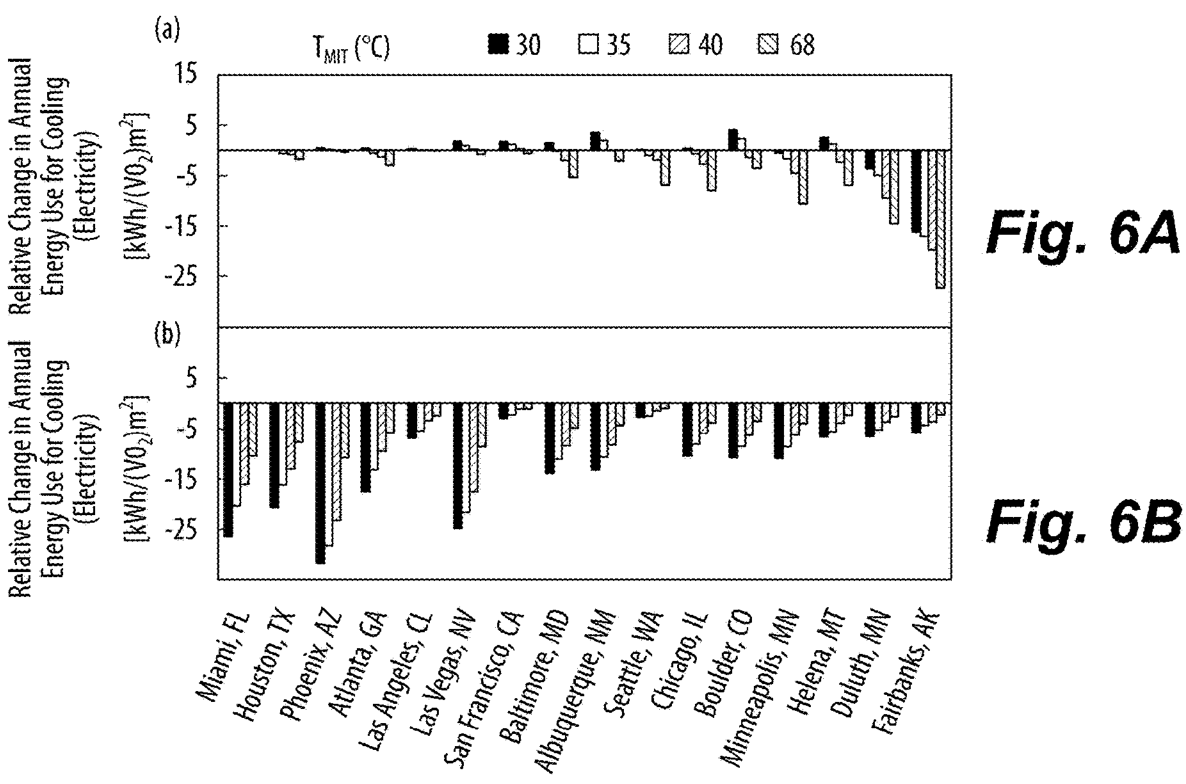
Fig. 6A
Fig. 6B
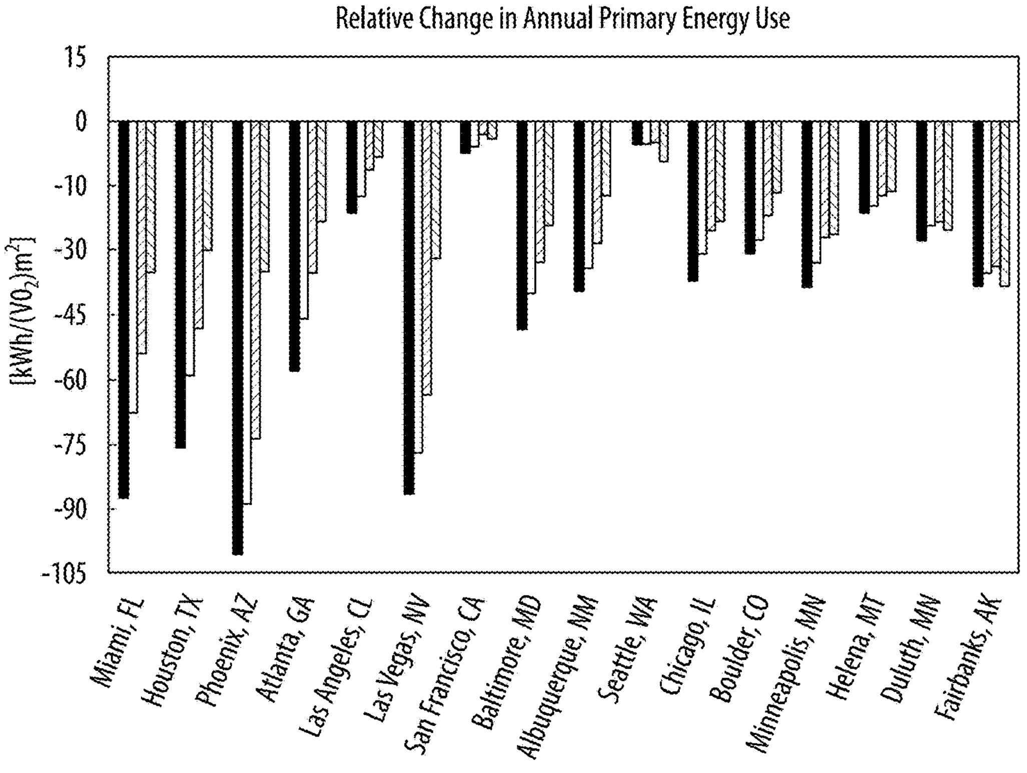
Fig. 6C

SMART COATINGS

CROSS-REFERENCE TO RELATED APPLICATIONS

This application claims priority to and the benefit of U.S. Provisional Patent Application No. 63/381,928, filed Nov. 1, 2022, the entire content of which is incorporated by reference herein.

TECHNICAL FIELD

The present disclosure relates to smart coatings, e.g., for windows.

BACKGROUND

Traditionally attempts to manufacture thermochromic windows have led to coatings with agglomeration or a darkening effect in an uneven pattern, which leads to inconsistent absorption or reflection of light and deteriorates the overall aesthetics of the window and/or reduces visibility through the window. Thus, there is no viable thermochromic window in the art.

There remains a need in the art for improvements. This disclosure provides a solution for this need.

SUMMARY

In accordance with at least one aspect of this disclosure, a thermochromic window can include, a thermochromic fiber layer configured to block or permit transmission of electromagnetic radiation through the thermochromic fiber layer as a function of a temperature of the thermochromic fiber layer. In embodiments, the temperature can be a critical temperature, and below the critical temperature, the thermochromic window can permit full spectrum radiation through the window, while above the critical temperature, the thermochromic window can reflect infrared radiation.

In embodiments, the thermochromic window can include a first transparent layer and a second transparent layer, and the thermochromic fiber layer can be sandwiched between the first transparent layer and the second transparent layer or embedded in the second transparent layer to immobilize the thermochromic fiber layer.

In embodiments, thermochromic fiber layer can include a vanadium oxide ($VO_2$) nanoparticle layer. In embodiments, the thermochromic fiber layer can include an electrospun nanofiber mat comprised of at least $VO_2$ nanoparticles. In embodiments, the thermochromic fiber layer can include a matrix formed from a polymer and a solvent. In certain embodiments, the polymer can include one of polyvinylpyrrolidone (PVP), polyethylene oxide (PEO), polyvinyl butyral (PVB), or polyvinyl alcohol (PVA) and the solvent can include one of ethanol, water, or anisole.

In certain embodiments, the nanofiber mat can include a nanofiber mat comprised of $VO_2$ nanoparticles embedded in the polymer. In certain embodiments, the matrix can include about 1% by weight $VO_2$ nanoparticles relative to polymer, about 19% by weight polymer relative to solvent, and about 80% by weight solvent.

In embodiments, the second transparent layer can include an epoxy layer. In certain embodiments, the second transparent layer can include a highly cross-linked epoxy. In embodiments, a refractive index of the thermochromic fiber layer substantially matches a refractive index of the second transparent layer.

In accordance with at least one aspect of this disclosure, a thermochromic window configured to selectively absorb or reflect infrared radiation as a function of a critical temperature can include, a transparent glass layer, a thermochromic fiber layer having at least $VO_2$ nanoparticles therein disposed on the transparent glass layer, and a transparent resin layer disposed on the thermochromic fiber layer configured to immobilize the at least $VO_2$ nanoparticles between the transparent glass layer and the resin layer.

In accordance with at least one aspect of this disclosure, a thermochromic coating for a window can include, an electrospun layer having fibers comprised of polymer and vanadium dioxide ($VO_2$). The electrospun layer can be thermochromic such that it permits less infrared (IR) radiation or less near-IR radiation above a thermochromic temperature. The thermochromic coating can have a refractive index matched outer layer configured to cause the electrospun layer to be transparent on the visual spectrum.

In accordance with at least one aspect of this disclosure, a method can include forming an electrospun thermochromic coating having a uniform opacity. The electrospun thermochromic coating can be configured to block or permit transmission of electromagnetic radiation through the thermochromic coating as a function of a temperature of the thermochromic coating.

In embodiments, forming can further include preparing a solution of a polymer, a solvent, and $VO_2$ nanoparticle powder and electrospinning the thermochromic coating as a nanofiber mat formed from the polymer and $VO_2$ nanoparticle powder to embed $VO_2$ nanoparticles within the polymer and immobilize the $VO_2$ nanoparticles in the fiber mat.

In certain embodiments, the nanofiber mat of the thermochromic coating can be electrospun directly onto a transparent glass layer, e.g., to form a thermochromic window. In certain embodiments, the thermochromic coating can be configured alter opacity of the nanofiber mat to block or permit transmission of electromagnetic radiation through the window as a function of a temperature of the thermochromic coating.

In embodiments, the method can include forming an epoxy layer on the window to sandwich the fiber mat of the thermochromic coating between the transparent glass layer and the epoxy layer. In embodiments, the method can further include thermally cross-linking the thermochromic coating after electrospinning. In certain embodiments, electrospinning can occur for up to 24 hours.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIGS. 1A-1D is a schematic illustration of a nanofiber based composite system, wherein:

FIG. 1A is a schematic cross sectional view of view of the composite system;

FIG. 1B shows a progressively magnified schematic plan view of the nanofiber, nanoparticle composite layer, the left box is least magnified, the middle box is magnified to show the nanofibers, and the right box is magnified to show the nanoparticles embedded on the nanofibers;

FIG. 1C-1 shows a schematic animation of free nanoparticles agglomerating over time;

FIG. 1C-2 shows a schematic animation of the nanoparticles embedded in the nanofibers immobilized over time;

FIG. 1D-1 shows a schematic representation of a refraction index matching of an embodiment of a nanofiber composite system and a permeability of the nanofiber composite system;

FIG. 1D-2 shows a schematic representation of an embodiment of a nanofiber composite system and a permeability of the nanofiber composite;

FIGS. 2A-2F is a visual characterization of the $VO_2$ and tungsten doped $VO_2$ nanoparticles (W—$VO_2$ NPs), and their encapsulation in the nanofibers, wherein:

FIG. 2A shows differential scanning calorimetry (DSC) curves for $VO_2$ and W—$VO_2$ nanoparticles;

FIG. 2B shows X-ray diffraction (XRD) patterns of W—$VO_2$ and $VO_2$, with the inset highlighting the shift at the (200) reflection;

FIG. 2C shows a high-resolution XPS spectra of the W—$VO_2$, showing the regions associated with the V 2p (top) and 3p (bottom) electrons;

FIG. 2D shows X-Ray Fluorescence (XRF) spectra for W—$VO_2$ and $VO_2$, showing the characteristic emission of V ($K_\alpha$ and $K_\beta$) and the W ($L_\alpha$ and $L_\beta$);

FIG. 2E shows micrographs of the fiber mat system obtained with scanning electron microscope; and FIG. 2F shows High-Resolution Transmission Electron Microscopy (HR-TEM) micrographs of the W—$VO_2$-loaded NFs and the accompanying elemental scan maps, showing the particles are isolated within the fiber.

FIGS. 3A-3C is a time lapse visualization of the change in the appearance of the nanofibers mats spun on glass with increasing time, wherein FIG. 3A shows camera images presenting step-by-step fabrication process for the $VO_2$ NP-based smart window;

FIG. 3B shows camera images representing change in the appearance of the W—$VO_2$ loaded nanofiber mats spun on glass with increasing time; and FIG. 3C shows camera images representing change in the appearance of pristine nanofiber mats spun on glass with increasing time;

FIGS. 4A-4F shows optical performance of an embodiment of a composite system, wherein:

FIG. 4A shows a simulated total spectral transmittance of an experimental implementation in accordance with one or more aspects of this disclosure;

FIG. 4B shows the effect of $VO_2$ volume ratio (%) to PVP on the total spectral transmittance for the insulating phase;

FIG. 4C shows the effect of $VO_2$ volume ratio (%) to PVP on the total spectral transmittance for the metallic phase;

and FIG. 4D shows a measured total spectral transmittance of an experimental implementation in accordance with one or more aspects of this disclosure FIG. 4E shows a refractive index matching enhancement for $VO_2$-PVP fiber mat in insulating phase; and FIG. 4F shows a refractive index matching enhancement for $VO_2$-PVP fiber mat in metallic phase;

FIG. 5A-5B shows a graphical representation of the durability performance of the $VO_2$ nanofiber based composite film, wherein FIG. 5A shows variation of the spectral optical transmittance of $VO_2$ composite film as a function of aging time; and FIG. 5B shows a comparison of solar modulation ability of $VO_2$ nanofiber based composite film with the previous $VO_2$ nanoparticles based coatings utilizing core/shell structure, crosslinked polymers and multi-layer structure;

FIG. 6A-6C shows the annual performance comparison between the base-case and the retrofit scenarios, wherein FIG. 6A shows annual energy use for heating;

FIG. 6B shows annual energy use for cooling; and

FIG. 6C shows annual primary energy use for retrofitting scenarios relative to the base-case;

FIGS. 9A-9C show a three-dimensional meshed geometry of the simulation setup in accordance with an experimental example of one or more embodiments of the present disclosure, wherein:

FIG. 9A is perspective view of a fiber;

FIG. 9B is an axial cross-sectional view of a fiber showing an orientation of the fibers therein; and FIG. 9C is a radial cross-section of a fiber showing a relative placement of particles within the fiber.

DETAILED DESCRIPTION

Figure 2A:
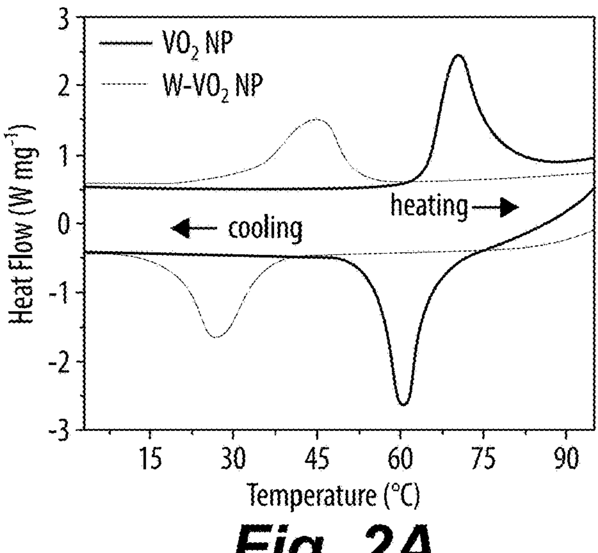

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1A and is designated generally by reference character 100. Other views, embodiments, and/or aspects of this disclosure are illustrated in FIGS. 1B-9C.

In accordance with at least one aspect of this disclosure, for example as shown in FIG. 1A, a thermochromic window 100 can include a first transparent layer 102, a second transparent layer 104, and a thermochromic fiber layer 106. In certain embodiments, the thermochromic fiber layer may be embedded in the second transparent layer 104. In certain embodiments, the thermochromic fiber layer 106 can be sandwiched between the first transparent layer 102 and the second transparent layer 104.

As shown in FIGS. 1B and 1C, the thermochromic fiber layer 106 can include a vanadium oxide ($VO_2$) nanoparticle (NP) layer having $VO_2$ nanoparticles 108. As used herein, the term fiber layer can include a layer of the fibers alone, or any suitable matrix containing the fibers. For example, a layer having fibers therein, weather weaved, spun, or otherwise contained generally within a polymer matrix, e.g., as shown in the progressive magnification of FIG. 1B. In certain embodiments, the thermochromic fiber layer can include electrospun nanofiber mat comprised of at least $VO_2$ nanoparticles, where the $VO_2$ nanoparticles are embedded within the nanofiber (NF) fibers 110, as shown in FIGS. 1B and 1C, for example.

As shown in FIG. 1D, the thermochromic window 100 can be configured to selectively absorb or reflect infrared radiation (IR) as a function of a critical temperature $T_C$. The thermochromic fiber layer 106 can be configured to have a critical temperature (e.g., a transition temperature) such that at temperatures below the critical temperature, the thermochromic window permits 100 a first amount of visible light and near infrared (IR) through the window 100, and at temperatures above the critical temperature, the thermochromic window 100 permits a second amount visible light or near IR, less than the first amount. The thermochromic layer 106 can be configured to have a critical temperature selected based on an intended climate of use and/or known weather patterns.

FIGS. 1A-1D show $VO_2$ nanoparticles 108 embedded in the nanofibers 110 of the thermochromic layer 106. The window 100 can include the first transparent layer 102, e.g., glass, the thermochromic layer 106 and an overcoat (e.g., the second transparent layer 104). In embodiments, the $VO_2$ nanoparticles 108 can be tungsten doped (W—$VO_2$). Embodiments of the thermochromic window shown in FIGS. 1A-1D provide improved $VO_2$ dispersion quality maintained throughout the curing process, the refractive indices of the thermochromic fiber layer 106 and second transparent layer 104 result in transparency of an otherwise opaque fiber mat, and the epoxy overcoat 104 results in limited permeability of water vapor and oxygen, which are accelerating agents in the oxidation of the $VO_2$, associated with loss of the thermochromic properties (e.g., as shown in FIG. 1D). For example, as shown in FIG. 1D-2, the epoxy overcoat can prevent oxygen and water from making contact to $VO_2$ nanoparticles. Otherwise, without the overcoat 104, oxygen and water can deteriorate the performance of $VO_2$ nanoparticles as shown in FIG. 1D-1.

Referring now to FIGS. 2-3, in embodiments, the thermochromic fiber layer 106 can include a matrix formed from a polymer and a solvent. In certain embodiments, the nanofiber mat 110 includes a nanofiber mat 110 comprised of $VO_2$ nanoparticles 108 embedded in the polymer. In certain embodiments, the polymer can include one of polyvinylpyrrolidone (PVP), polyvinyl butyral (PVB), polyethylene oxide (PEO) or polyvinyl alcohol (PVA). Any suitable polymer capable of creating a stable suspension for the $VO_2$ during electrospinning is contemplated herein. In embodiments, the solvent can include one of ethanol, methanol, water, or anisole. Any suitable solvent capable of both dispersing and suspending the $VO_2$ nanoparticles and also dissolving the polymer is contemplated herein.

In embodiments, the matrix can include about 5-35% by weight $VO_2$ nanoparticles relative to polymer, about 5-20% by weight polymer relative to solvent, and about 45-90% by weight solvent. In certain embodiments, the matrix can include, by total weight percentage, about 1% $VO_2$ nanoparticles, about 19% polymer, and about 80% solvent. In certain embodiments, the matrix can include, 3000 mg of solvent (e.g., ethanol), 400 mg polymer (e.g., PVP), and 100 mg $VO_2$ nanoparticles. In embodiments, a ratio of polymer to nanoparticles can be between 1:6 and 5:7, with the remainder of the solution being solvent. One having ordinary skill in the art in view of this disclosure will readily appreciate that the exact ratios of constituents can be varied as desired to optimize the thermochromic properties of the window without sacrificing transmission of visual light. In embodiments, the matrix can be highly cross-linked to ensure structural integrity of the fiber mat and to reduce permeation of gases through the window to the fiber mat.

In embodiments, the second transparent layer can include an epoxy layer (e.g., epoxy resin). The material of the second transparent layer can be any suitable epoxy having a refractive index that substantially matches a refractive index of the thermochromic fiber layer (e.g., the combined refractive index of the polymer and the $VO_2$ nanoparticles) so as to make the thermochromic fiber layer appear transparent when adjacent the second transparent layer.

In accordance with at least one aspect of this disclosure, a method, can include forming a thermochromic layer on a window. Forming can include preparing a solution of a polymer, a solvent, and $VO_2$ powder, and electrospinning a nanofiber mat formed from the polymer and $VO_2$ to embed $VO_2$ nanoparticles embedded within the polymer and immobilize the $VO_2$ nanoparticles in the fiber mat. In embodiments, the nanofiber mat can be spun directly onto a transparent glass layer. In embodiments, the method can include thermally cross-linking the fiber mat after electrospinning. In certain embodiments, electrospinning can occur for up to 24 hours. In embodiments, the method can further include forming an epoxy layer on the window to sandwich the fiber mat between the transparent glass layer and the epoxy layer.

In accordance with at least one aspect of this disclosure, a thermochromic window configured to selectively absorb or reflect infrared radiation as a function of a critical temperature can include, a transparent glass layer, a thermochromic fiber layer having at least $VO_2$ nanoparticles therein disposed on the transparent glass layer, and a transparent resin layer disposed on the thermochromic fiber layer configured to immobilize the at least $VO_2$ nanoparticles between the transparent glass layer and the resin layer. In embodiments, below the critical temperature, the thermochromic window can permit full spectrum radiation through the window, and above the critical temperature the thermochromic window can reflect infrared radiation.

In accordance with at least one aspect of this disclosure, a thermochromic coating for a window can include an electrospun layer having fibers comprised of polymer and vanadium dioxide ($VO_2$). The electrospun layer can be thermochromic such that it permits less IR or near IR above a thermochromic temperature. The coating can also include a refractive index matched outer layer configured to cause the electrospun layer to be transparent on the visual spectrum.

Recently, the Department of Energy (DOE) funded a project that has developed a continuous process to inexpensively produce uniform $VO_2$ nanoparticles at commercial scale volume with phase transition temperature as low as 30° C. However, there remains a need int eh art for a manufacturing technique to apply $VO_2$, with low cost and energy-efficient process. Embodiments provide a cost-effective way to manufacture high performing and durable thermochromic windows for both the new and retrofit market. Reducing cost of material, ease of manufacturing, environmental stability under various climatic condition using one or more embodiments described herein allow for large-scale adoption of thermochromic windows possible.

Embodiments provide thermochromic windows exhibiting tunable thermal and optical properties which can reduce energy consumption and $CO_2$ emissions and can provide an avenue for mass production of thermochromic smart windows, coatings and adhesives based on nanofiber composite system.

Embodiments include a scalable, cost-effective two step-fabrication process to achieve environmentally stable $VO_2$ glazing for smart window applications. Embodiments include fabrication of $VO_2$ composite using polyvinylpyrrolidone (PVP) nanofiber formed into a nanofiber mat, followed by the encapsulation of the nanofiber mat into epoxy resin on the window. The composite of the described embodiments can be configured to regulate solar transmission in the near-infrared range (780-2500 nm) above a critical temperature (e.g., a phase temperature) of 35° C., upon undergoing a metal-to-insulator transition (TMIT). In other words, embodiments of the composite can block IR radiation when its temperature rises due to sun exposure.

Embodiments include a vanadium dioxide ($VO_2$) embedded electrospun nanofiber as the active material and epoxy resin as the matrix to fabricate thermochromic windows. In embodiments, the transparency of the window can be achieved through the matching of refractive index of nanofibers and epoxy resin (e.g., as shown in FIG. 1). Embodiments of a fabrication process can include encapsulating the $VO_2$ nanoparticles (NPs) into polyvinylpyrrolidone (PVP) electrospun nanofibers (NF), followed by embedding these fibers into epoxy resin (e.g., as shown in FIG. 2). In embodiments, PVP can be used for the fiber basis as it produces well-dispersed nanoparticle suspensions. During electrospinning, the rapid evaporation of the solvent can generate uniform nanofibers (~500 nm) with well-separated and encapsulated $VO_2$ NPs (~70 nm). In embodiments, the epoxy resin is chosen to have closely matching refractive index to the spun PVP fibers. In embodiments, the refractive indices $\eta$ at 550 nm, PVP: 1.52 Epoxy: 1.55, can be used as encapsulating media, allowing traditional opaque $VO_2$ embedded PVP fiber mats to be made transparent through refractive index matching. Furthermore, in embodiments, the epoxy can be an extensively cross-linked polymer with a low gas diffusion coefficient, suitable for preventing accelerating $VO_2$ oxidizing agents, (e.g., oxygen, moisture, acids) which can cause loss of the thermochromic properties of the window.

Embodiments provide for sustained $VO_2$ nanoparticles (NPs) dispersion quality less susceptible to agglomeration. In embodiments, because the $VO_2$ NPs are immobilized throughout the curing process, the overall performance of the thermochromic coating is stable during the operation of the window.

Embodiments of a method of manufacture the thermochromic window allow for improved control over the concentration and distribution of the $VO_2$ NPs throughout the surface and improved phase stability in resulting composites. The location and concentration of the $VO_2$ NPs throughout the matrix can be determined directly by the location and thickness of the NFs mat. This can be made more consistent employing one or more methods described herein.

In certain circumstances, if $VO_2$ NPs are oxidized to other forms of hydroxides then the window losses its thermochromic properties and the ability to block IR radiation is diminished or lost. In embodiments, the epoxy overcoat provides limited permeability of water vapor and oxygen, or other $VO_2$ oxidizing accelerating agents to reduce or prevent loss of thermochromic properties. Environmental aging tests (e.g., at 90° C., 95% humidity) show the overall performance of embodiments of the described thermochromic film is stable over a long lifetime of operation necessary for practical adoption of $VO_2$ based thermochromic windows under different climatic conditions in the U.S., for example as shown in FIGS. 3-5B.

Embodiments include a thermochromic window configured and adapted to block incoming IR radiation at critical temperature. In embodiments, the critical temperature of the window can be modified (e.g., from 30° C.-68° C.) through doping the $VO_2$ nanoparticles with tungsten. In certain embodiments, the $VO_2$ nanofiber composite system greatly increase the thermal resistance of the thermochromic windows by lowering the thermal conductivity. For example, without the thermochromic coating, glass has a thermal conductivity of ~1 W/mK, which can be lowered to ~0.3 W/mK applying the described thermochromic coating to the glass. In such embodiments, the thermochromic coating can be ~30 um thick $VO_2$-PVP fiber mat.

Traditional thermochromic windows having various composite films experience a lifetime under environment aging test at (90° C., 95% humidity) of about 100 h to 1000 h. In embodiments, the thermochromic coating showed no decline in performance after the environmental aging test both in accelerated aging chamber with temperature of 90° C. and a ~95% relative humidity and exposure to average 78% humidity and ~28° C. temperature and rain, providing recognizable improvements to traditional coatings in live conditions after 3000 h and 6 months of exposure in a real environment.

Traditionally, thermochromic windows have been produced using various techniques including chemical vapor deposition (CVD), pulsed laser deposition (PLD), sputtering deposition and sol-gel processing all presented $VO_2$ thermochromic glazing. However, most of these techniques are expensive, energy extensive and doesn't allow control over size and distribution and phase transition temperature of $VO_2$ nanoparticles. At lab-scale, a nanoscale morphology engineering approach can be used, where $VO_2$ particle size is less than 100 nm, the structure of the particles is tailored, the particles are embedded in polymeric film using bladed coating. However, electrospun coating proved most effective to enhance thermochromic performance over traditional methods. Embodiments include electrospun fiber mats as described herein.

Polymeric films such as polyurethane (PU), polyvinyl butyral (PVB), polydimethylsiloxane (PDMS), or poly(methyl methacrylate) (PMMA) with thicknesses typically below 50 microns, have all been traditionally adopted to make thermochromic windows. However, these films exhibit agglomeration of $VO_2$ nanoparticles, diffusion of oxygen and moisture in the polymeric matrices, and low thermal resistance. Embodiments using the described nanofiber composite system ensures stability of $VO_2$ for longer use and provides significant advantage over the state-of-the-art approach in terms of cost, performance, and ease of manufacturing.

In embodiments, embedding the $VO_2$ nanoparticles in the PVP fiber mat followed by encapsulation in epoxy resin elongates the lifetime of $VO_2$ nanoparticles and ensures environmental durability for practical applications. Embodiments allow for precise control of size and distribution of $VO_2$ nanoparticles and maintains the dispersion quality of $VO_2$ nanoparticles in the system which are susceptible to agglomeration. Embodiments of a manufacturing method allow for high volume manufacturing, enabling lower cost and larger area window using electrospinning allows for cost-effective process for large-scale production for commercial use. Electrospinning can be a cost-effective and energy-efficient fabrication process that allows for rich and diverse array of composite materials with varying geometry and scale, enabling lower cost and scalable area window for large-scale production for commercial use. In embodiments, the $VO_2$ nanoparticles embedded in PVP fibers can significantly increase the thermal resistance of window, or reduction of conduction or transfer of heat from inside to outdoor environment through the thermochromic window, in addition to the window's IR blocking properties.

Embodiments include smart windows having the intelligent regulation of indoor solar irradiation and modulation of optical properties in response to real-time temperature would have significant contribution to rapid developments for energy-saving purposes in building sector.

Embodiments of thermochromic glazing using $VO_2$ nanoparticles as presented herein provides a sustainable cost-efficient solution for energy-saving smart windows. Thermochromic glazing can also improve a windows optical performance, such as low luminescence (visible) transmittance ($T_{lum}$), low solar modulation ability ($\Delta T_{sol}$) and high switching temperature ($T_{MIT}$). Embodiments of a thermochromic coating and thermochromic wind as disclosed herein address environmental stability of $VO_2$ nanoparticles, which can determine lifetime and lifecycle of the smart windows as well as managing cost and energy requirements for manufacturing process to apply $VO_2$. Embodiments described herein have demonstrated nanofiber based composite system, where $VO_2$ embedded crosslinked nanofibers were used as the active material and refractive index matched epoxy resin were used as the protection matrix, to ensure environmental stability of $VO_2$ nanoparticles (NP) during the lifetime of operation. Embodiments of a method include a cost-efficient, low-energy input electrospinning technique which allows for a precise control over the size and distribution of $VO_2$ NPs was utilized to achieve scalable fabrication process. The prepared samples with improved optical properties ($T_{lum}$~60% and $\Delta T_{sol}$~20%) showed little to no decline in thermochromic performance and retained ~99% solar modulation ability (~20%) after exposure to an accelerated environmental aging test (60° C. and 95% relative humidity) for 2660 hours and over 6 months of practical exposure to an average 20° C. temperature and 74% relative humidity in Florida, USA. The energy analysis for embodiments of the thermochromic window shows potential energy saving of up to 27 kWh/$VO_2$ ($m^2$) and 32 kWh/$VO_2$ ($m^2$) for heating and cooling, respectively, and highlight the impact of $VO_2$ glazing with improved thermal properties and various $T_{MIT}$ on carbon emission reduction across the U.S. climate zones.

Embodiments of the thermochromic window include smart window technologies with the intelligent regulation of indoor solar irradiation and modulation of optical properties in response to real-time temperature which can provide a sustainable cost-efficient candidate to reduce the heating and cooling loads of buildings. Systematic review of embodiments of thermochromic windows based on current findings show they can potentially save heating and cooling energy demand from 5 to 84%, compared to plain glass depending on glazing types and climatic conditions. $VO_2$, an inorganic compound, can have regulation capability of solar transmission in the near-infrared range (780-2500 nm) at critical temperature of 68° C., upon undergoing a metal-to-insulator transition ($T_{MIT}$). The $T_{MIT}$ can be further modified to a lower temperature for comfortable building environment using doping elements such as tungsten (W) and magnesium (Mg), for example as described in Zhou et al., "Mg-doped $VO_2$ nanoparticles: hydrothermal synthesis, enhanced visible transmittance and decreased metal-insulator transition temperature," Physical Chemistry Chemical Physics 15(20) (2013) 7505-7511; Liang et al., "One-step hydrothermal synthesis of W-doped $VO_2$ (M) nanorods with a tunable phase-transition temperature for infrared smart windows," ACS omega 1(6) (2016) 1139-1148; Zomaya, et al., "W-doped $VO_2$/PVP coatings with enhanced thermochromic performance," Solar Energy Materials and Solar Cells 200 (2019) 109900; and Zeng et al., "Research progress on the preparation methods for $VO_2$ nanoparticles and their application in smart windows," CrystEngComm 22(5) (2020) 851-869, all of which are incorporated by reference herein in their entirety.

Various techniques can be used to apply $VO_2$ thermochromic glazing with different shapes, sizes and switching potentials, for example, including chemical vapor deposition (CVD), pulsed laser deposition (PLD), sputtering deposition, and sol-gel processing, for example, as described in Kim et al., "Pulsed laser deposition of $VO_2$ thin films," Applied physics letters 65(25) (1994) 3188-3190, Zhang et al., "High performance $VO_2$ thin films growth by DC magnetron sputtering at low temperature for smart energy efficient window application," Journal of Alloys and Compounds 659 (2016) 198-202; and Lan et al., "Synthesis of sub-10 nm $VO_2$ nanoparticles films with plasma-treated glass slides by aqueous sol-gel method," Applied Surface Science 357 (2015) 2069-2076, all of which are incorporated by reference herein in their entirety. However, embodiments utilizing nanoscale morphology engineering approach, where $VO_2$ particle size (<100 nm) and structure is tailored, can be more effective to enhance thermochromic performance determined by, luminescence (visible) transmittance ($T_{lum}$) and solar modulation ability ($\Delta T_{sol}$), where $\Delta T_{sol}$ is defined as the difference in $T_{sol}$ (0.38 to 2.5 μm) between low and high temperatures and $T_{lum}$, is the standard visible transmittance (0.38 to 0.78 μm), respectively.

At present, various polymeric films such as PU, PVB, PDMS, PMMA with thicknesses typically below 50 microns, have all been explored to embed $VO_2$ nanoparticles (NPs) to make thermochromic windows. Although these $VO_2$ based films have reported good initial thermochromic performance with relatively high $T_{lum}$, of ~50%, and $\Delta T_{sol}$ of ~17%, and though traditional challenges, such as high switching temperature, excessive opacity of metallic phase state and limited solar modulation have been addressed to a certain extent, certain thermochromic windows can still suffer from the short comings of low environmental stability and high cost of large-scale production. Certain $VO_2$ NP-based thermochromic glazing can have low environmental stability from the fact that the phase-switchable $VO_2$ NPs can turn to non-switchable $V_2O_5$ when exposed to oxygen and moisture in the ambient air for several weeks or months, which result in the loss of $\Delta T_{sol}$. Previous studies have demonstrated a dramatic shift in thermochromic performance of $VO_2$ films when exposed to relatively high humidity for only 24 hours, deterring the practical application of $VO_2$ based smart window. To increase both the $T_{lum}$, and $\Delta T_{sol}$ as well as the lifetime of $VO_2$ NPs in the host matrix, stable metal oxides such as Al—O, $TiO_2$, ZnO, $SiO_2$, $MgF_2$, and $Cr_2O_3$ were proposed as protective shell layer, $VO_2$ shell or bilayer structure to enhance thermochromic properties. However, in practical applications, the stress interface between $VO_2$ and the metal oxide shell induced by the lattice structure transformation of $VO_2$ NPs can lead to the formation of cracks, which results in the loss of $\Delta T_{sol}$. For example, some studies have demonstrated clear formation of cracks in $VO_2$ based multilayer thin films after ~1000 times of reversible phase transitions. In addition, cracks could be found in $SiO_2$ and $TiO_2$ shells, during the synthesis process. The lifetime of $VO_2$ $SiO_2$ NPs under accelerated aging condition (90° C., 90% humidity) were found to be ~72 h due to appearance of such cracks. Furthermore, a modelling study, considering the influence of both the thickness of shell materials and optical constants such as effective refractive index and effective extinction coefficient of a $VO_2$ core-shell NPs, showed that it could be difficult to improve $T_{lum}$, and $\Delta T_{sol}$ simultaneously.

High volume manufacturing, which enables lower cost and larger area window processing using the available methods can be a challenge and is in the early stage of adoption for practical applications. The typical cost-efficient preparation method for obtaining large and easy-to-use $VO_2$ NP coatings that can be easily integrated into existing glass products is the solution methods. However, widely used lab-scale solution coating methods, i.e., spin coating, blade coating, dip-coating are typically rarely used in large-scale production, with the largest samples reported at 0.3×0.4 $m^2$, 0.6×0.3 $m^2$, respectively. The wire-bound rod coating method used in industry for its quality precision and continuous production is generally used in manufacturing of flexible substrates, such as labels, tapes and flexible packaging. Recently developed continuous roll-coating method has been used for rigid substrate (e.g., glass) by selecting flexible rubber roller and presented $VO_2$ NPs coated glass as large as 1.2×1.0 $m^2$ with improved weatherability. But there still are challenges faced with regards to $VO_2$ agglomeration, precise control over size and distribution of $VO_2$ NPs and long-term environmental stability of $VO_2$, critical for performance of the $VO_2$ nanocomposites over long-life of operation.

To address these challenges, embodiments of the thermochromic coating and window allow for a cost-effective two-step fabrication process to achieve highly scalable and environmentally stable $VO_2$ glazing with enhanced thermochromic properties. The two-step approach can include fabrication of $VO_2$ composite nanofiber (NF) mats using electrospinning, followed by the encapsulation of the NF mats into polymer resins. Embodiments address several common issues of $VO_2$ NP based composites, such as the $VO_2$ dispersion quality, as well as controlling the concentration and distribution of the NPs. Moreover, encapsulation can allow for limiting the permeability of gas and moisture into the system and matching the refractive indices of the NF and matrix converts opaque NF mats to transparent composite films. Furthermore, the methodology as described herein can be compatible with surface modifications routinely applied to improve performance and stability (e.g. antireflection, superhydrophobicity, etc.).

Embodiments of the thermochromic coating include a scalable $VO_2$ loaded NF mat with a variable thickness (<30 μm) were fabricated possessing excellent tunable thermochromic properties, high luminous transmittance ($T_{lum}$>60%), and solar modulation ability ($\Delta T_{sol}$~20%). Environmental aging tests both in an accelerated aging chamber (60° C. temperature and a ~95% relative humidity) and in Florida's environmental conditions for a 6-month practical exposure to ~74% humidity and 20° C. temperature were performed to determine the environmental stability and long-term durability of the samples. Furthermore, a comprehensive study to find optimal solutions for $VO_2$ NP-based glazing under different climate conditions in U.S., representing maximum primary energy savings and their environmental impact, $CO_2$ emission reduction using the developed $VO_2$ NP-based thermochromic smart windows, was fully discussed.

FIGS. 1A-1D show fabrication and characterization of an embodiment of a $VO_2$ fiber mat. As shown in FIGS. 1A-1D, embodiments of the $VO_2$ loaded fiber mats were fabricated using an electrospinning technique (FS1), which has been extensively utilized to generate thin fibers of composite materials with varying geometry and scale from polymer solutions, for example as discussed in Bognitzki et al., "Nanostructured fibers via electrospinning," Advanced materials 13(1) (2001) 70-72; and Reneker et al., "Electrospinning jets and polymer nanofibers," Polymer 49(10) (2008) 2387-2425, which are incorporated by reference herein in their entirety. The major advantages of exploiting this approach for thermochromic glazing application include sustained $VO_2$ NP dispersion quality, control over the concentration and distribution of the NPs, and improved phase stability in resulting composites, e.g., as shown in FIGS. 1A-1D. The thermochromic properties of $VO_2$ can include dramatically attenuating near-IR light above a critical temperature, associated with a transition to the tetragonal rutile phase.

In FIG. 1A-1D, a schematic illustration of the NF based composite system 100, where W—$VO_2$ NPs 108 are embedded in PVP NFs 110, and the system 100 is embedded in epoxy with an overcoat 104. The three distinct phenomena associated with this fabrication method can be observed. First, the $VO_2$ dispersion quality can be maintained throughout the curing process, second, the refractive indices of the two materials can result in transparency of an otherwise opaque fiber mat, and, third, the epoxy overcoat can result in limited permeability of water vapor and oxygen, which are accelerating agents in the oxidation of the $VO_2$, associated with loss of the thermochromic properties.

For practical applications, composites with $VO_2$ embedded as nanoscale particles have been suggested to achieve optimum performance, with great efforts towards achieving scalable production of monodisperse $VO_2$ NPs. However, NPs have unique processing challenges. For example, liquid suspensions of nanoparticles can be thermodynamically unstable; they can be susceptible to agglomeration in liquids, and Laplace pressure effects may broaden the particle size distribution (i.e. Ostwald ripening). Therefore, embodiments of the method described herein provides a method to maintain dispersion quality throughout the composite fabrication process, which can be essential for realizing the performance of these materials. As discussed herein, embodiments encapsulated the $VO_2$ NPs into polyvinylpyrrolidone (PVP) electrospun NFs, followed by embedding these fibers into a polymer resin. The resulting composite was stable; the NPs were immobilized throughout the curing process, and the overall performance of the film was stable over a long lifetime of operation. Well-dispersed $VO_2$ NP suspension in PVP ethanol solution were used for electrospinning. The rapid evaporation of the solvent during the electrospinning generated uniform NFs with well-separated and encapsulated $VO_2$ NPs, for example as shown in FIGS. 2A-2*e*.

Figure 2B:
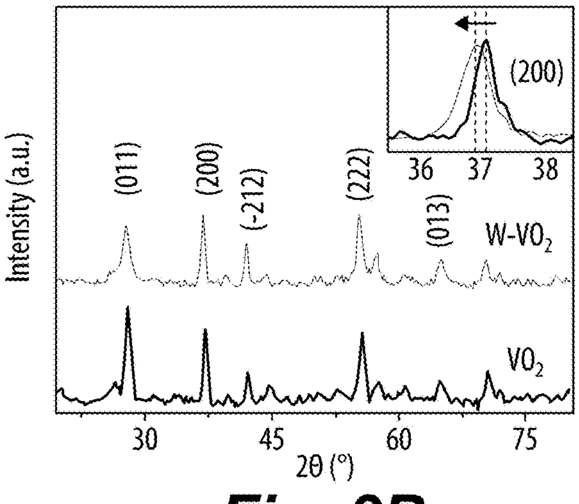
Figure 2C:
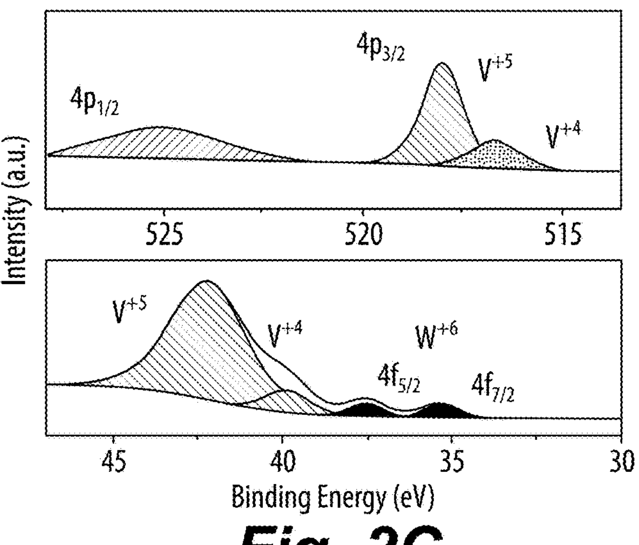
Figure 2D:
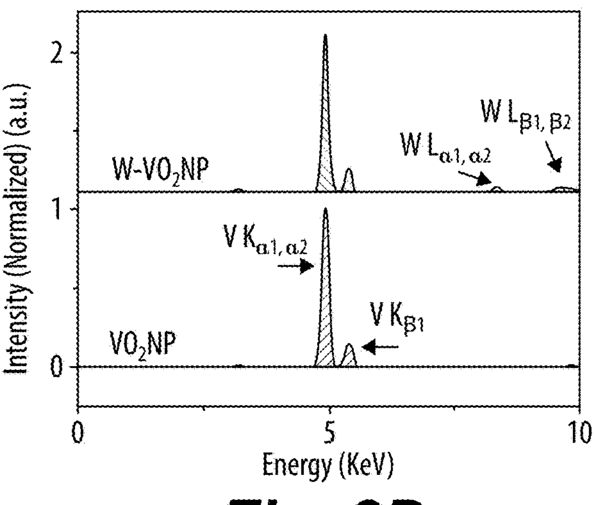
Figure 2E:
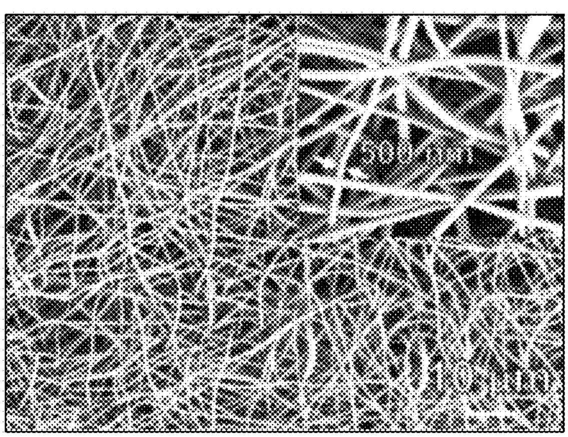
Figure 2F:
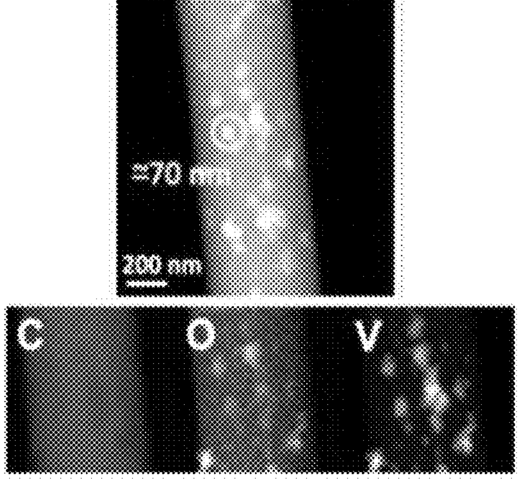

FIGS. 2A-2F shows the characterization of the $VO_2$ and W—$VO_2$ NPs, and their encapsulation in the NFs. FIG. 2A shows DSC curves for $VO_2$ and W—$VO_2$ NPs. FIG. 2B shows XRD patterns of W—$VO_2$ and $VO_2$, with the inset highlighting the shift at the (200) reflection. FIG. 2C shows the high-resolution XPS spectra of the W—$VO_2$, showing the regions associated with the V 2p (top) and 3p (bottom) electrons. FIG. 2D shows XRF spectra for W—$VO_2$ and $VO_2$. FIG. 2E shows micrographs of the fiber mat system obtained with SEM, displaying NFs with average diameter of 500 nm (Inset). FIG. 2F shows HR-TEM micrographs of the W—$VO_2$-loaded NFs and the accompanying elemental scan maps, showing the particles are isolated within the fiber. Each of these discussed further below.

First, the properties of the NPs utilized were examined, which ultimately determines the properties of the glazing. Since the thermochromic properties of $VO_2$ NPs result from the phase transition, differential scanning calorimetry (DSC) was performed on $VO_2$ and tungsten doped $VO_2$ (W—$VO_2$) NPs. It was found that W doping reduced the $T_{MIT}$ from 70.4° C. to 44.6° C., e.g., as shown in FIG. 2A. The change in $T_{MIT}$ can be attributed to the expansion of the $VO_2$ lattice, as observed in the diffraction pattern obtained from X-ray diffraction (XRD) (e.g., as seen in FIG. 2B inset). A shift in the (200) peak from 37.1° to 36.9° was observed, verifying the lattice expansion which resulted in an overall decrease in the lattice stability and thus lower temperature required for the phase transition. Also, the concentration of W in the doped NPs was evaluated through X-Ray Fluorescence (XRF), determined to be 1.5 at %. The fluorescence spectra in FIG. 2D, showed the characteristic emission of V ($K_\alpha$ and $K_\beta$ and the W ($L_\alpha$ and $L_\beta$). The chemical state of the W—$VO_2$ was determined by X-Ray Photoelectron Spectroscopy (XPS). High-resolution scans of photoelectrons with binding energies associated with 2p and 3p electrons are shown in FIG. 2C. Deconvolution of the high-resolution scans showed evidence of partial oxidation, with both V(IV) and V(V) states observed, these states being associated with $VO_2$ and $V_2O_5$, respectively. The binding energies of the $2p_{3/2}$ electrons associated with the V(IV) and V(V) states were found to be 516.7 and 518.0 eV, respectively. The relatively broad $2p_{1/2}$ peak was not deconvoluted. While V(V) was detected in the XPS spectra, the signal of $VO_2$ dominated the XRD pattern, indicating that a significant portion of the interior maintained the ideal V(IV) state. XPS analysis probes~10 nm into the surface, therefore, a substantial portion of the interior remained as thermochromically active $VO_2$. The region of the spectrum associated with V 3p electrons overlaps partially with the W 4f electrons, with the signals of the $4f_{7/2}$ and $4f_{5/2}$ present in the spectra with binding energies of 35.3 and 37.5 eV, respectively.

The incorporation of the NPs into polymer fibers was then analyzed. The freshly dispersed W—$VO_2$ NPs suspension in 15 wt % PVP was electrospun into NFs, which were then thermally crosslinked for stability. The as-spun fiber mats were characterized using Scanning Electron Microscopy (SEM), with accompanying micrographs of a typical fiber mat shown at higher magnifications in FIG. 2E. The NFs were measured at 500 nm in diameter, with no particles observed on the fiber surface. The embedded NPs were observed using High-Resolution Transmission Electron Microscopy (HR-TEM), with the accompanying elemental mapping obtained from Energy Dispersive X-Ray Spectroscopy (EDX) showing the localization of the vanadium and oxygen elements, thus confirming the distribution of the $VO_2$ NPs, which can be seen in FIG. 2E.

Figure 3A:
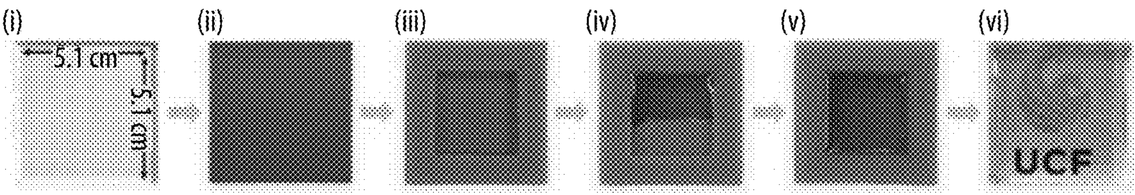
Figure 3C:
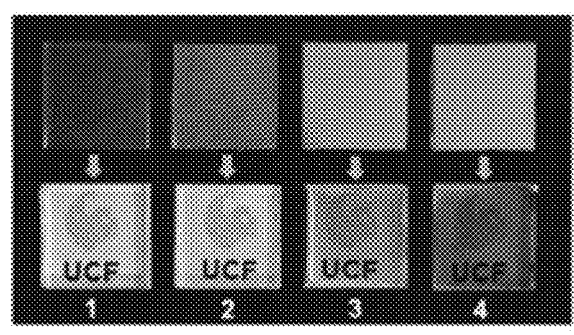
Figure 3B:
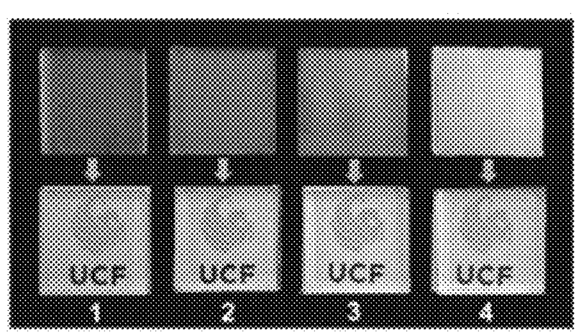
Figure 3D:
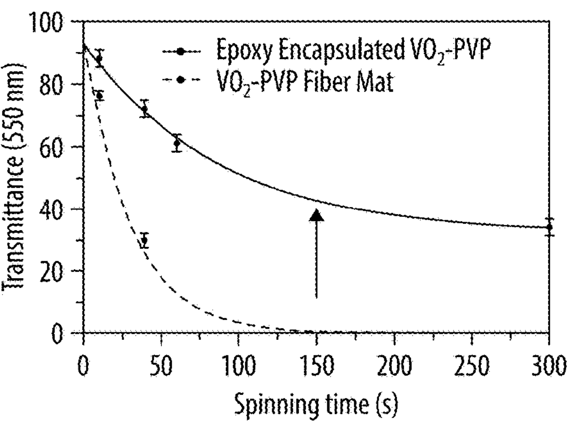
FIG. 3D shows transmittance spectra vs spinning time is for $VO_2$ loaded nanofibers, epoxy encapsulation induced the match of refractive index and increase the transmittance.
Figure 3E:
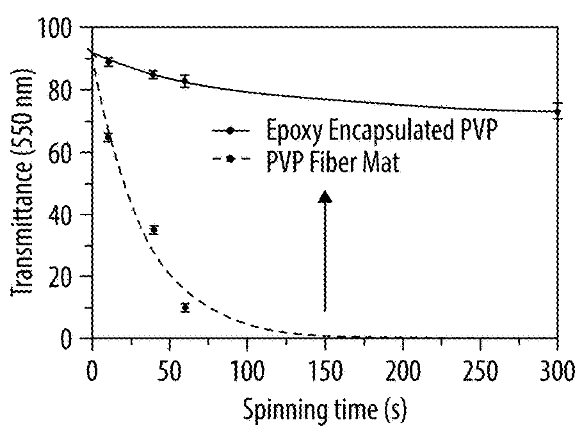
FIG. 3E shows transmittance spectra vs spinning time is for pure nanofibers epoxy encapsulation induced the match of refractive index and increase the transmittance.

With reference now to FIGS. 3A to 3E, the optical properties of NF/embedded polymers is discussed. FIG. 3A shows camera images presenting step-by-step fabrication process for the $VO_2$ NP-based smart window, where (i) 5.1×5.1×0.25 cm glass slide; (ii) Glass covered with 5 um thick $VO_2$ NP-loaded PVP fiber mat after a minute of electrospinning; (iii) Crosslinked fiber-coated glass placed in 5.1×5.1×6 cm silicon mold; (iv) Encapsulation with refractive index matched clear cast epoxy; (v) Airdried epoxy encapsulated fiber-coated glass after 96 h; and (vi) Final product of $VO_2$ NP-based smart thermochromic glazing. The images representing change in the appearance of the W—$VO_2$ loaded NF mats (FIG. 3B) and pristine NF mats (FIG. 3C) spun on glass with increasing time. The return of the transmittance can be seen after encapsulation with epoxy. The transmittance spectra (550 nm) vs spinning time is shown for the $VO_2$ loaded NFs (e.g., as shown in FIG. 3D) and pure NFs (e.g., as shown in FIG. 3E).

As shown, the randomly oriented polymer NF mats may minimally absorb incoming visible light; however the scattering is pronounced, and these mats exhibit a sharp increase in opacity with only a few micrometers of NFs deposited onto a glass surface (e.g., as shown in FIG. 3B). The prominent diffuse reflectance is directly attributed to the size and shape of fibers, as well as the difference in refractive indices of the fibers and their surrounding media (i.e., air). It is commonly observed that transparency is restored to opaque objects when the medium is changed from air to a matrix of more similar refractive index ($\eta$). It is this difference in $\eta$ which is responsible for the opacity, therefore we have selected fibers (PVP) and an encapsulating media (epoxy) which match closely in their respective refractive indices ($\eta$ at 550 nm, PVP: 1.52 epoxy: 1.55).

FIG. 3A represents the step-by-step fabrication process based on the refractive index matching, showing originally opaque W—$VO_2$ imbed PVP fiber mat turning into transparent PVP/epoxy composite films. To test this refractive index matching to improve transmittance, the pristine PVP NF mats (without $VO_2$ NPs) were deposited rapidly, and their transmission with spinning time was shown in FIG. 3C. After only 50 seconds, there was <10% transmittance after attenuation of the visible light, with the full spectra shown in FIG. 3E. Encapsulation with epoxy restored the transmittance of the fiber system, with the same sample restored to >83% T. The optical properties of the W—$VO_2$ in PVP NF system was then determined, both in air and following their encapsulation in epoxy (e.g., as shown in FIGS. 3B and 3D).

A similar trend was observed, with a further decrease in transmittance, attributed to the size and concentration of the W—$VO_2$ NPs. It should be noted that this is the absolute transmission and no correction was included for reflections in the system. It can be challenging to adequately model the optics of these system, and simulation is thus desired to handle to the great number of variables present in these systems (e.g. the fiber diameter, orientation, fill factor, and absorption, the refractive indices of the components and surroundings, etc.). A series of Finite Element Modeling (FEM) simulations were then performed to investigate the optical properties of $VO_2$ embedded NFs. The spectral transmittance of the system in the visible and near-infrared regions were calculated.

Figure 4D:
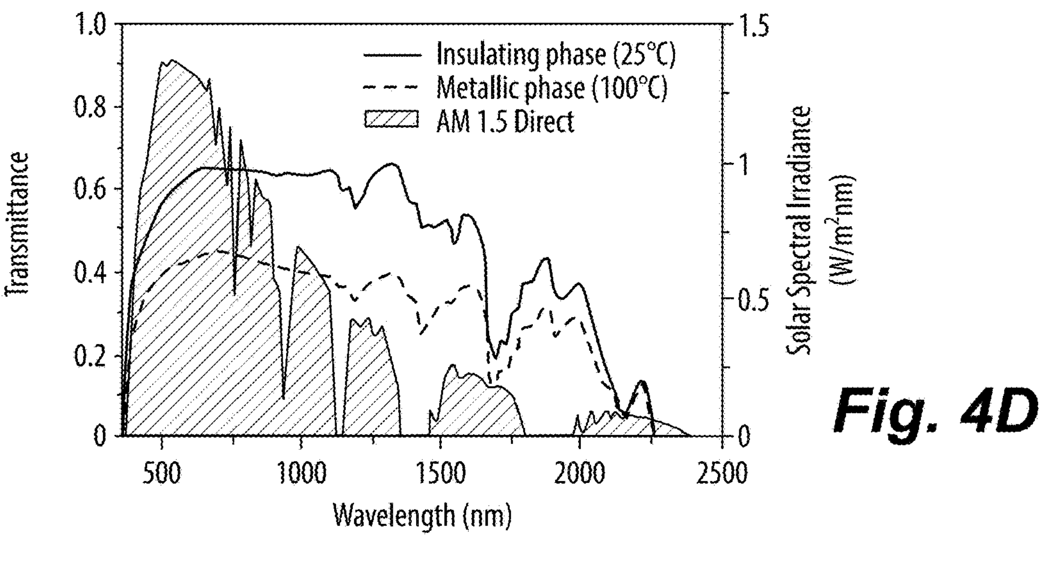
Figure 4E:
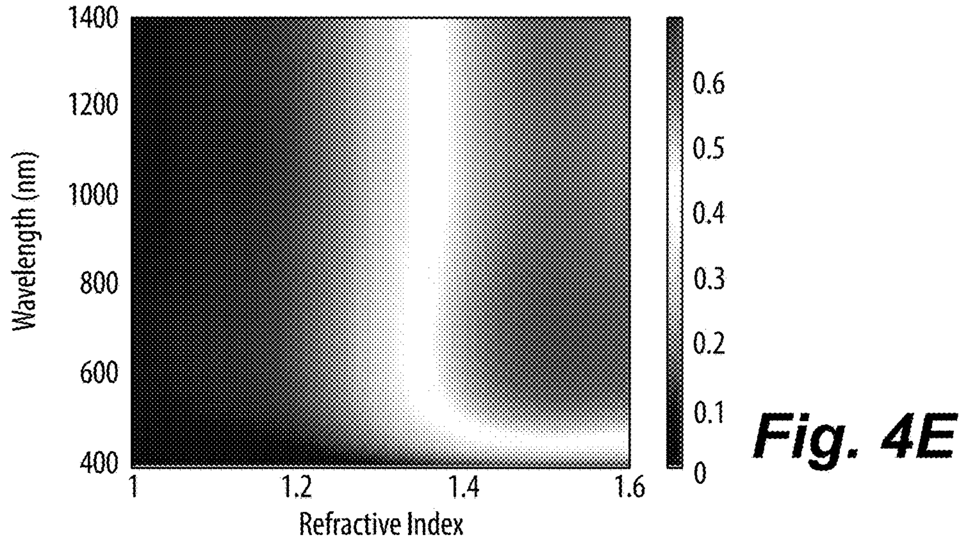
Figure 4F:
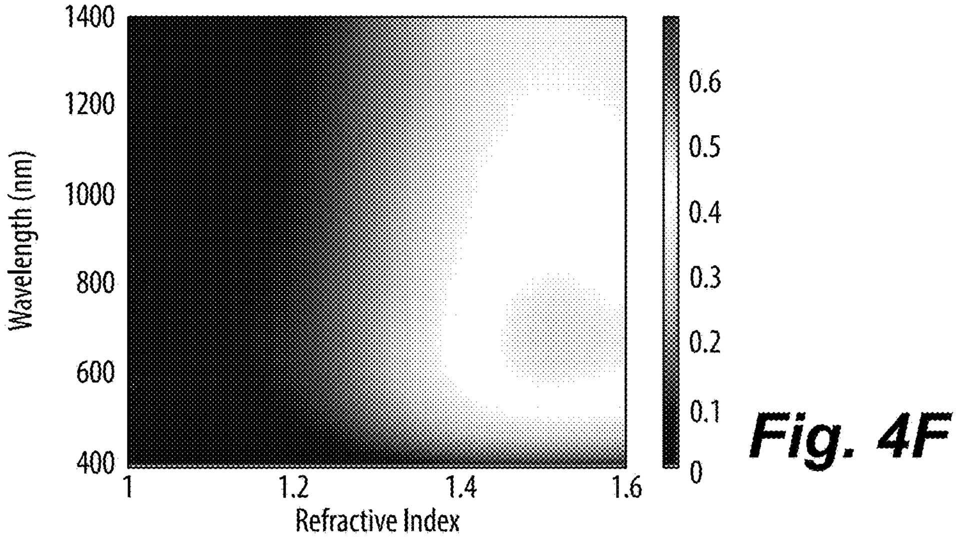

FIGS. 4A and 4D represent a simulated and measured total spectral transmittances of an experimental implementation on accordance with one or more aspects of this disclosure. FIG. 4A shows simulated results for an epoxy encapsulated $VO_2$-PVP fiber coated glass and FIG. 4D shows measured results. Clear color change before ($T>T_{MIT}$) and after ($T<T_{MIT}$) phase transition is observed in the insert of FIG. 4D. It is observed that simulated and experimental spectra from 380 nm to 1100 nm for both the metallic and the insulating phase were consistent but differed from 1100 nm. Previous studies showed no dips in transmission beyond 1100 nm with the increase in $VO_2$ NPs and/or thickness in nanostructured composite films, indicating that the dips in transmittance after 1100 nm were only due to presence of the epoxy resin. The modeling setup only considered the constant values of the refractive indices of epoxy resin (n=1.55, k=0).

FIG. 4A-4F show optical performance of the $VO_2$ loaded NF based composite film in accordance with at least one aspect of this disclosure. Total spectral transmittance of the epoxy encapsulated $VO_2$-PVP fiber coated glass in the insulating phase (25° C.) and in the metallic phase (60° C.). FIG. 4A shows simulated and FIG. 4D shows experimental, where the luminous transmittance is ~60% and solar modulation ability is ~20%. The effect of $VO_2$ volume ratio (%) to PVP on the total spectral transmittance for the insulating (FIG. 4B) and the metallic phase (FIG. 4C). The refractive index matching enhancement for $VO_2$-PVP fiber mat in insulating phase (FIG. 4E), and metallic phase (FIG. 4F), respectively. The color bar indicates the transmittance percentage.

In embodiments, the solar modulation ability, the difference between high ($T>T_{MIT}$) and low ($T<T_{MIT}$) temperatures, in the 500 nm to 1400 wavelength was ~20%, which was consistent with the experimentally obtained values shown herein. The experimentally measured data in FIG. 3E showed significant enhancement in the visible transmittance, when $VO_2$-PVP fiber mats were encapsulated with a clear cast epoxy with a similar refractive index. To determine the effect of refractive index matching on the transmittance of the system, the refractive index of the matching layer was swept from 1 to 1.6 for both the metallic and the insulating phase, respectively. Note that for the lower values of refractive index, the transmittance of the system can be very low. A significant change in transmission was observed as the refractive index of the matching layer increased. The maximum transmittance occurred when the refractive index of the matching layer was close to the refractive index of the PVP NFs and transmittance was totally diminished as the refractive index approached 1, shown in FIG. 4A-4F. Furthermore, the concentration of $VO_2$ NPs in fiber mat also played an important role in the transmittance of the system.

As shown in the simulated and experimental results for one or more embodiments, it can be seen that the spectral transmittance of both the insulating phase and the metallic phase were significantly lower with the higher concentration of $VO_2$ NPs shown (e.g., FIGS. 4B and 4C). This is because the incident light only sees $VO_2$ NPs everywhere in the unit cell. The effect was modeled based on changing the volume fraction of $VO_2$ to PVP NFs. The size of the $VO_2$ NPs and the diameter of PVP NFs were 70 nm and 500 nm, respectively, based on the obtained experimental values shown in FIGS. 4E and 4F.

For a small fraction of $VO_2$ e.g. 5% $VO_2$ and 95% PVP, within fiber mat, the maximum transmittance was observed at 88% and 69% in the insulating phase and metallic phase, respectively. However, a significant drop to 41% ($T<T_{MIT}$) and 31% ($T>T_{MIT}$) was observed for the higher concentration of $VO_2$ (80% $VO_2$, 20% PVP). The same trend was also observed with the experimental data, where high spinning time led to higher thickness of the $VO_2$-PVP fiber mat, which results in higher concentration of the $VO_2$ NPs. The simulated results were consistent with the experimentally observed transmittance. The evaluation of the geometrical parameters, size and concentration of $VO_2$ NPs and NFs and the refractive index of NFs and the encapsulating medium is necessary to optimize the optical performance of NP imbed NF based composite films for window application.

Figure 5A:
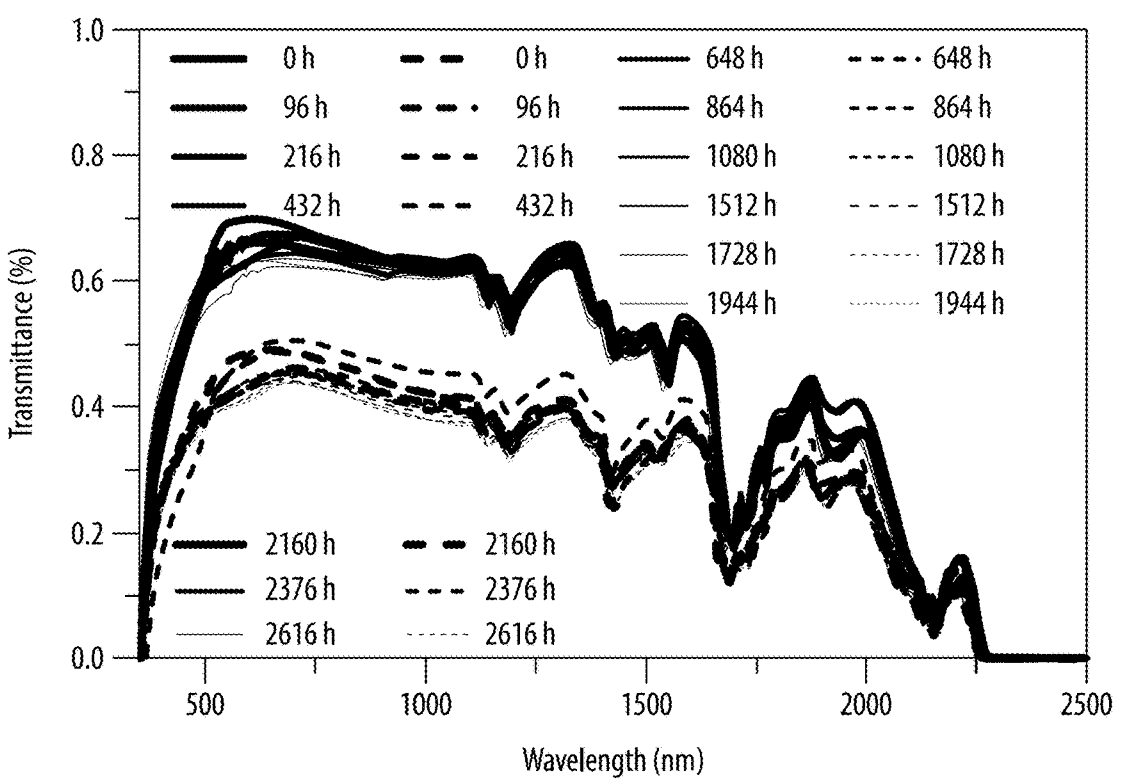
Figure 5B:
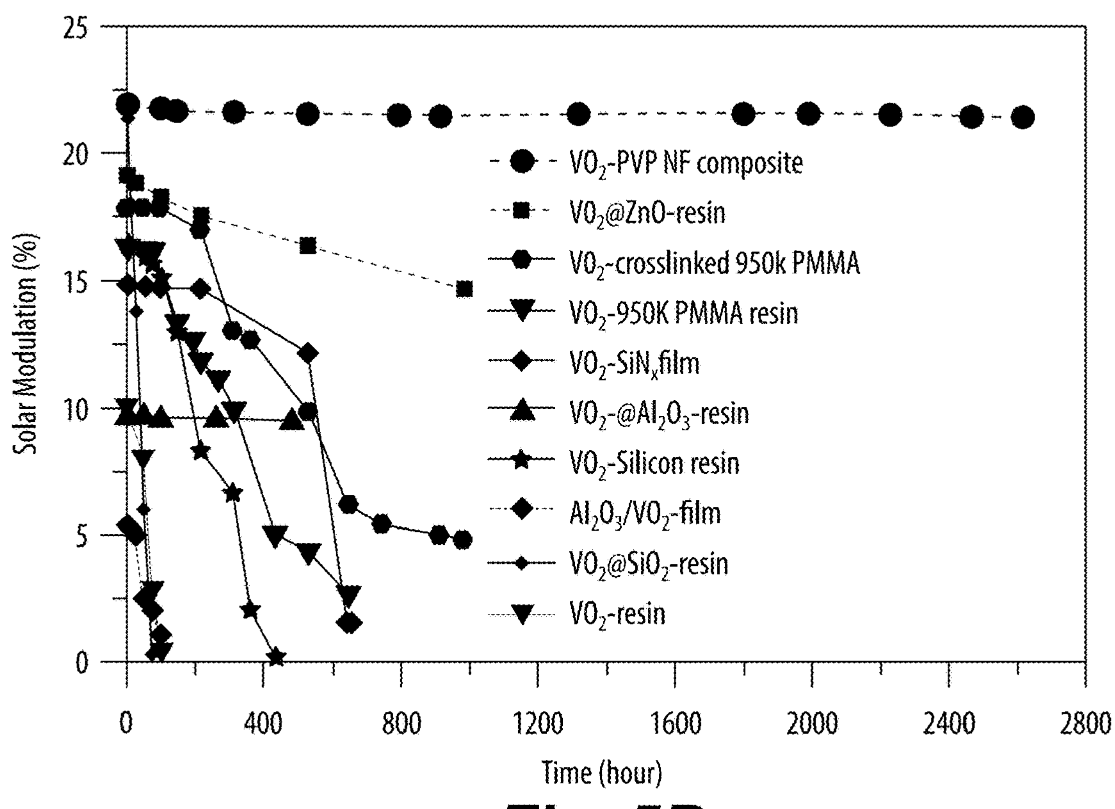

With reference now to FIGS. 5A-5B, the durability of $VO_2$ NP-based thermochromic glazing in accordance with one or more embodiments of this disclosure will be discussed. In FIG. 5, durability performance of the $VO_2$ nanofiber based composite film is shown, wherein in FIG. 5A shows variation of the spectral optical transmittance of $VO_2$ composite film ($VO_2$ NPs embedded in ~5 um thick PVP NFs with 2.5 mm epoxy overcoat) as a function of aging time. The low and high temperature for optical measurements were 25° C. (insulating phase) and 60° C. (metallic phase), respectively. FIG. 5B shows a comparison of solar modulation ability of $VO_2$ NF based composite film with the previous $VO_2$ NP based coatings utilizing core/shell structure, crosslinked polymers and multi-layer structure. The aging tests were conducted in an accelerated environmental chamber at 60° C. temperature and 90% relative humidity.

In real environments, agents such as oxygen, moisture and acids, can transform switchable $VO_2$ to other forms of non-switchable vanadium dioxides and hydroxides. This can result in the loss of solar modulation in $VO_2$ NP-based thermochromic glazing. Therefore, it is necessary to minimize the system's susceptibility to permeation of gas and other liquids. To avoid chemical deterioration of $VO_2$, previous studies have primarily focused on fabrication of core-shell structure, where chemically stable and transparent shell materials including $SiO_2$, $TiO_2$, ZnO, $AlO_x$, $MgF_2$ and others, were adopted to inhibit the diffusion of moisture and acid in the environment and ensure long term stability of $VO_2$ NPs in the polymeric matrices. However, as mentioned above, the volume change (~0.3%) caused by the periodic phase-transition of $VO_2$ may damage the shell by forming cracks, exposing $VO_2$ to oxygen and moisture. Furthermore, it remains challenging to make $VO_2$ NPs disperse separately and be encapsulated by shell material uniformly, making chemical synthesis complicated and time consuming.

Embedding $VO_2$ NPs in a crosslinked polymer matrix is another way to lower the diffusion rate of oxygen and moisture into the system. Previous study has shown that highly crosslinked and highly entangled PMMA matrix can significantly improve the lifetime of the $VO_2$ NPs from 100 h to 1000 h under accelerated aging environment (60° C., 90% humidity). However, after 1000 hours the decline in thermochromic performance was still observed and solar modulation was reduced from ~18% to ~3%, attributed to degree of crosslinking and surface hardness. To address these concerns, embodiments have introduced a doubly crosslinked system, where $VO_2$ NPs were first embedded inside a thermally crosslinked PVP fiber mat, followed by encapsulation in the epoxy layer with 50% fiber mat-epoxy filling ratio. Then an additional 2.5 mm epoxy overcoat was added as protective layer. The stability of the system can be largely attributed to the epoxy overcoat; the highly crosslinked matrix allows for minimal diffusion of ambient gas and water at elevated temperatures, mainly used as anticorrosion and weathering protection layer. The NPs were embedded in the PVP NF structures, which were located at the glass-epoxy interface, to maximize the protection of the epoxy overcoat. The PVP NFs showed marked structural degradation in humid environments, attributed to their considerable surface area and hygroscopic nature of PVP. The crosslinking allowed the integrity of these structures in ambient environments, and the exposure to aqueous environments.

The accelerated environmental aging tests at 60° C. temperature and ~90% relative humidity were then conducted, similar to the testing conditions reported in previous studies, to evaluate the durability of $VO_2$ NPs in the matrix in real environment. Systematic measurements of spectral transmittance at both low temperature (25° C., insulating phase) and high temperature (60° C., metallic phase) were recorded as a function of time to determine the variation of the thermochromic performance; degree of decrease in solar modulation illustrates the oxidation rate of $VO_2$ NPs in the matrix. Each measurement was then repeated three times to ensure testing reliability.

In the example of an experimental implementation in accordance with one or more embodiments of this disclosure shown in FIGS. 5A and 5B, it is seen that the $VO_2$ NF based composite film exhibited no noticeable change in optical transmittance after ~2600 hours (FIG. 5A), and the thermochromic performance of the $VO_2$ film shown in FIG. 5B remains the same with negligible difference (<1%) in solar modulation ability after 2600 hours exposure in accelerated environmental chamber, compared to previously reported values of $VO_2$ NPs coated by $SiO_2$ (~76 h), $Al(OH)_3$ (~120), $Al_2O_3$ (>480 h), ZnO (~900 h), $VO_2$ NPs embedded in silicone (~400 h), 950K PMMA (~600 h), crosslinked 950K PMMA (~1000 h), and $VO_2$ NPs protected by $Al_2O_3$ (~100 h), $SiN_x$ (600 h) films, indicating that $VO_2$ NPs remained thermodynamically stable throughout the aging process and the overall performance of the film was stable during the long lifetime of operation.

In addition, identical samples were also practically exposed to an average 20° C. temperature and 74% relative humidity in Orlando's environmental condition in Florida, USA. Systematic measurements of spectral transmittance for both the insulating phase and the metallic phase as function of time within 6-month period, showed no change in thermochromic performance, suggesting that NF composite system demonstrated a successful pathway to limit permeation of $VO_2$ oxidizing agents necessary for practical adoption of $VO_2$ based thermochromic windows under climatic conditions.

Figure 6D:
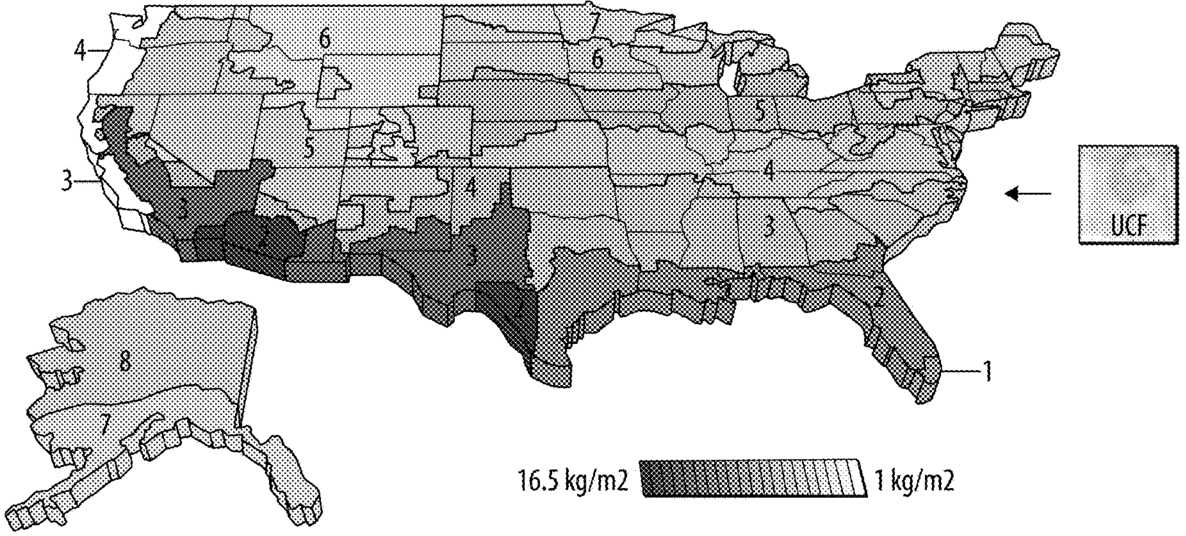
FIG. 6D is a representation of embodiments' impact on reducing carbon emission in 16 climate zones.

In FIG. 6A-6D, energy analysis of an example of an experimental implementation in accordance with one or more embodiments of this disclosure is shown. FIG. 6A shows the annual energy use for heating, FIG. 6B shows the annual energy use for cooling, FIG. 6C shows annual primary energy use for retrofitting scenarios relative to the base-case, and FIG. 6D shows potential carbon emission reduction for $T_{MIT}$=30° C. in all 16 climate zones.

Single-pane windows are widely in-use in the United States. In the warmer South, there are more than 40% and in the colder Northeast and Midwest regions, less than 30% of residential buildings still have single-pane windows. Poor thermal properties of single-pane windows cause a significant heat loss through the building envelope and consequently thermal discomfort, moisture condensation and increased overheating risks. According to an evaluation by the U.S. Department of Energy, a fully successful single-pane retrofit can reduce 1.2 quads ($1.22\times10^{18}$ J), 1.3% of domestic energy use in the United States. An ideal retrofit for energy efficient single-pane windows is simultaneously thermally insulating, visible-light transparent, and dynamically switchable in solar transmission. Embodiments of the $VO_2$ thermochromic films can dynamically respond to solar heat gain with the temperature change, but they can't block the heat loss due to low thermal resistance of the thin film. Previous studies have shown that although $VO_2$ thermochromic film improved the thermal comfort and condensation resistance of the single-pane windows in cold climates and reduced overheating risk in hot climates but because the solar transmittance of the $VO_2$ glazing (0.3~0.55) was significantly smaller than that of single-pane clear glass windows (~0.92), applying the $VO_2$ glazing increased the heating loads in cold climates. In the colder areas, the increased heating loads in winter are much higher than reduced cooling loads in the summer, suggesting that applying $VO_2$ thermochromic glazing overall increased the annual energy cost.

To assess the impact of embodiments of $VO_2$ NF based composite films as an energy-efficient window retrofits, a comprehensive simulation-based method was developed to demonstrate the energy saving potentials of all solutions across all U.S. climate zones. This method is an example of an experimental implementation in accordance with one or more embodiments of this disclosure, where annual heating and cooling energy need for a reference building model were calculated according to four scenarios: base-case scenario with single-pane windows, retrofit scenarios; $VO_2$ coated single-pane windows with four $T_{MIT}$: 30° C., 35° C., 40° C., 68° C. The simulations were based on a commercial reference building model developed by U.S. Department of Energy (DOE), which represented an existing medium size office constructed before the year 1980 (pre-1980) and categorized based on the 16 AHSRAE climate zones. For each transition temperature ($T_{MIT}$) of retrofit scenarios, the difference in annual energy needs for cooling and heating, primary energy use and the $CO_2$ emission compared to the base-case scenario was calculated for the 16 climate zones.

FIG. 6A-6D showed the annual performance comparison between the base-case and the retrofit scenarios. According to the results in FIG. 6A, for each square meter of applied $VO_2$ coating with $T_{MIT}$=68° C., the annual energy need for heating were reduced in all climate zones by up to 27.4 kWh. It also showed the potential saving in heating consumption in the majority of heating-load dominated climate zones for lower transition temperatures: 30° C., 35° C. and 40° C. This was mainly attributed to the improvement in thermal resistance of the film, where the thermal conductivity of the 2 mm single-pane clear glass was lowered from ~1.15 W/m-K to 0.3 W/m-K by applying 2.5 mm $VO_2$ coating layer, indicating that the $VO_2$ NF based composite system provided for thermally insulating and optically switchable retrofit film with tunable thermal and optical properties. Thermal conductivity values of $VO_2$-NF coated samples can be measured as a function of NF thickness. Detailed thermal property analysis of the NP loaded NF composite system is currently outside the scope of this study and will be discussed in our future study.

However, the theoretical study to evaluate the effect of geometric features such as film thickness, size and concentration of $VO_2$ NPs on thermal performance of films window retrofits can be found from our earlier study, Zhao et al., "Optically-switchable thermally-insulating $VO_2$-aerogel hybrid film for window retrofits," Applied Energy 278 (2020) 115663, which is incorporated by reference herein in its entirety. Furthermore, FIG. 6B shows a potential for cooling energy savings in all climate conditions and up to 32 kWh/($VO_2$) $m^2$ depending on the climate and the transition temperature. FIG. 6C shows the potential saving in annual primary energy use per square meter of applied $VO_2$ retrofit coating. Primary energy use measures the total energy demand across all U.S. climate zones. It seen that generally the cooling-load dominated areas (e.g., Miami, Phoenix, Houston) offer the most energy saving up to 100 kWh/($VO_2$) $m^2$. To complete the assessment, the difference in annual carbon emission were calculated based on the consumption of electricity for cooling and natural gas for heating. The emission factors of electricity and natural gas were shown in Table 4. FIG. 6D shows for each square meter of applied coating, the potential annual carbon emission was reduced by up to 22.6 kg. The coating with $T_{MIT}$=30° C. showed the highest impact on reducing carbon emission in all 16 climate zones. The potential annual carbon emission of the retrofit films with $T_{MIT}$: 35° C., 40° C., 68° C. is shown in FIG. 6D. The proposed $VO_2$ NF based retrofit film demonstrated a simple yet effective way to significantly reduce the carbon emission related to heating and cooling, which improves the sustainability of buildings.

Embodiments include a highly scalable and environmentally stable $VO_2$ thermochromic glazing based on nanofiber composite system using electrospinning technique, to cater to cost-efficient, low-energy input fabrication process, was successfully developed. In embodiments, the $VO_2$ NPs were incorporated into crosslinked electrospun PVP NFs to maintain well-separated and stable dispersion of the NPs. Upon casting epoxy to embed PVP fibers, a transparent composite film was achieved through refractive index matching, with the optical simulation highlighting the influence individual factors (fiber diameter, orientation, fill factor, absorption, and the refractive indices of components and surroundings) on the luminous transmittance. The implementation of epoxy overcoat and thermal crosslinking of the NFs protected the $VO_2$ NPs from diffusion of gas and moisture, ensuring environmental stability under various environmental conditions and long-duration times, in embodiments. In experimental examples of one or more embodiments having the $VO_2$ composite films with excellent thermochromic properties, high luminous transmittance 60%, solar modulation ability 20%, with tunable phase transition temperatures ($T_{MIT}$), showed no decline thermochromic performance and retained its solar modulation after exposure to an accelerated environmental aging test (60° C. and 95% relative humidity) for 2660 hours and over 6 months of practical exposure to an average 22° C. temperature and 74% relative humidity in Florida, USA. The experimental analysis of embodiments in use showed potential saving in annual primary energy use up to 104 KWh/($VO_2$) $m^2$ and 16.5 kg/($VO_2$) $m^2$ in carbon emission reduction, related to heating and cooling, improving the sustainability of buildings. Further optimization and integration of the developed process can initiate mass-production and mass-adoption of $VO_2$ smart windows.

Embodiments include Vanadium pentoxide ($V_2O_5$, 99.99%, Sigma Aldrich), W-doping vanadium oxide (W—$VO_2$, Shanghai Ximeng New Material Technology), oxalic acid dihydrate ($H_2C_2O_4 \cdot 2H_2O$, 99%, Sigma Aldrich), polyvinylpyrrolidone (PVP, Molecular Weight~1,300,000, Sigma Aldrich), ethyl alcohol (Ethanol, 99%, Sigma Aldrich), clear casting epoxy resin (Michaels Co.) that were purchased and used as-supplied without further purification. 5×5×0.6 cm silicon molds (Etsy Co.) and 5×5×0.21 cm clear flat glass slides (Glass Supplies 41 Co.) were used as received.

In embodiments, vanadium dioxide NPs can be synthesized using hydrothermal method, for example as discussed in Zhao et al., "$VO_2$-based composite films with exemplary thermochromic and photochromic performance," Journal of Applied Physics 128(18) (2020) 185107; and Guo et al., "Hydrothermal one-step synthesis of highly dispersed M-Phase $VO_2$ nanocrystals and application to flexible thermochromic film," ACS applied materials & interfaces 10(34) (2018) 28627-28634, which are incorporated herein by reference in their entirety. In a typical procedure, 2.0 g of $V_2O_5$ powder was added to 50.0 mL deionized water and was stirred at 450 rpm for 20 min, then 3.00 g of oxalic acid dihydrate was added to the mixture and further stirred until a clear light green slurry was formed. The suspension was then moved into a 150 mL Teflon-lined stainless-steel autoclave. The autoclave was kept at 260° C. for 24.0 h and then air-cooled to room temperature. The resulting black precipitates were collected by centrifuging, washed with deionized water and ethanol, successively and dried at 70° C. in air atmosphere for 2 h. The crystalline $VO_2$ (M) nanoparticles were then obtained after annealing in vacuum furnace at 540° C. for 2 h. Other various synthesis methods of monoclinic $VO_2$ (M) can be utilized as appreciated by one having ordinary skill in the art in view of this disclosure.

In embodiments, the $VO_2$-PVP fiber mat can be prepared using simple and low-cost electrospinning technique, for example as described in Reneker et al., "Electrospinning jets and polymer nanofibers," Polymer 49(10) (2008) 2387-2425, the entire content of which is incorporated herein by reference. To prepare the electrospinning solution, 0.08 g of as-synthesized $VO_2$ (M) nanoparticles was first dispersed in 3 gr ethanol and sonicated for 1 h. Then, 0.01 g PVP was added to the $VO_2$ solution under constant stirring at 450 rpm for 15 min to stabilize the $VO_2$ nanoparticles. Afterwards, an additional 0.45 g of PVP (15 wt. %) was added to the solution and left stirring overnight. The suspension was then transferred into 5 mL plastic syringe with 18 G needle and pumped out by a NE-1000 syringe pump at a flow rate of 14 μL/min. The electrospinning apparatus was set up in a vertical setting. The voltage was applied at 11.3 kV from the PS/EQ050P024-22 power supply (Glassman High Voltage Inc.). The needle-collector distance was set to 13 cm, and the produced fibers collected onto 5×5×0.5 cm glass substrates. The fibers mats were placed in a vacuum oven at 230° C. for 24 h to promote crosslinking and stability.

In embodiments, to fabricate the nanocomposites, the 2-part commercial epoxy was first prepared through mixing a 1:1 v/v ratio of the base resin and hardener. The mixture was stirred for several minutes, followed by degassing for 10 min in the vacuum oven to remove residual bubbles. The clear casting epoxy was then slowly poured onto crosslinked fiber-coated glass placed in 2.5×2.5×6 cm silicon mold and air dried for 96 h to achieve thermochromic glazing. To generate superhydrophobic surfaces, silicone microstamps were used to generate a microstructured epoxy surface. A lined microstructure (10 μm wide×10 μm tall×10 μm spacing) was supplied by Research Microstamps (South Carolina, USA). To apply the pattern, the stamp was coated in a thin layer of epoxy resin and placed onto the surface of the target composite. After allowing to cure, the microstamp was delaminated, and a hydrophobic surface was obtained.

In the experimental studies of one or more embodiments, the following equipment was utilized. The $VO_2$ nanoparticle size and distribution in the PVP fibers were characterized by high-resolution transmission electron microscopy (HR-Transmission Electron Microscopy (TEM)) imaging and energy-dispersive X-ray spectroscopy (EDX) elemental mapping on the TEM Tecnai F30 instrument. The size and morphology of the electrospun nanofibers were determined using Zeiss (Oberkochen, Germany) ULTRA-55 FEG Scanning Electron Microscopy (SEM). The phase transition properties of the as-synthesized $VO_2$ powder and commercially purchased tungsten doped $VO_2$ were determined using Differential Scanning calorimetry (DSC), e.g., Netzsch (DSC 204 F1 Phoenix). The heating/cooling rate was set at 10° C./min in the temperature range from 0° C. to 140° C. The crystalline phase of the $VO_2$ and W—$VO_2$ were identified using X-ray diffraction (XRD, Panalytical (Malvern, Worcestershire, United Kingdom) Empyrean using Cu ka source operated at 45V and 40 mA with a 4 mm divergence slit. Photoelectron spectroscopy was used to analyze surface chemistry was carried out with a X-Ray photoelectron spectroscopy Thermo Scientific (Massachusetts, U.S.) ESCALAB Xi+ X-ray Photoelectron Spectrometer Microprobe. The X-ray fluorescence spectra were collected with a Malvern Panalytical Epsilon 1. The transmission spectra of the $VO_2$-PVP fiber mats were collected with a UV-Visible Spectrometer (e.g., a Cary (Santa Clara, California, USA) 300 UV-visible spectrophotometer). The spectral characterization of $VO_2$-based nanocomposites was performed with a setup comprising a microscope-coupled (Hyperion 1000, Bruker Optics Inc.) Fourier-Transform Infrared Spectroscopy (FTIR) spectrometer (Vertex 80, Bruker Optics Inc.).

The spectrometer is configured with a thermal source, a KBr beam splitter, and a liquid nitrogen-cooled MCT detector. The microscope can be configured for reflection and transmission measurements, respectively. The measurements were performed using two different sets of objective lens separately.

The microscope can be configured with a cryo-cooled MCT detector for infrared (1-20 μm), and an RT-Si Diode & RT-GaP Diode detector for visible-NIR (0.35-1.5 μm) domain. The spectrometer is configured with a thermal globar source and a KBr beam splitter, along with an external halogen source connected to one side. The system can be configured for both reflection and transmission measurements. The measurements were performed with a pair of $CaF_2$ objective (2.4×, 0.07 NA, 0.3-8 μm) lens, and both the abovementioned detectors were successively utilized to measure the entire region of interest. To measure the spectra of $VO_2$ composite films at high temperatures, the metallic phase, a square ceramic heater (Thorlabs, HT24S2), connected to a DC power supply, and were placed at the edge of the optical path. The samples were heated through convection.

During the experimental analysis, transmission spectra was measured and averaged 128 times and each averaged measurement was repeated three times at the same location to ensure data accuracy. Backgrounds were taken in air at room temperature similar to the conditions in which the experiments were performed. Regarding thermal properties, accurate thermal conductivity measurement of the samples were performed using modified transient plane method (Trident, C-THERM). D.I. water was used the contact agent between the samples and sensors surface. The ensure reproducibility in the contact between the sample and the sensor and to minimize thermal contact resistance, a specific weight was also placed on the samples. Final reported thermal conductivity values were given as arithmetic mean of 3-5 individual results to ensure data accuracy. To evaluate the thermochromic performance of the fabricated films, luminous transmittance ($T_{lum}$, 380-780 nm), integrated solar transmittance ($T_{sol}$, 450-2500 nm), and solar modulation efficiency ($\Delta T_{sol}$, 450-2500 nm) were calculated based on the transmittance spectra. The measured total spectral transmittance of the $VO_2$ composite films at low temperature (~25° C.) and high temperature (~60° C.) were shown in FIG. 4B. The values were obtained using the following equations:

$$\tau_{lum} = \frac{\int_{380\ nm}^{780\ nm} I_\lambda \tau_{\lambda,tot} d\lambda}{\int_{380\ nm}^{780\ nm} I_\lambda d\lambda} \quad (1)$$

$$\tau_{sol} = \frac{\int_{280\ nm}^{2500\ nm} I_\lambda \tau_{\lambda,tot} d\lambda}{\int_{280\ nm}^{2500\ nm} I_\lambda d\lambda} \quad (2)$$

where $I_\lambda$ is the solar radiation intensity of air mass 1.5 (AM1.5) corresponding to the sun standing 37° above the horizon, and $\tau_\lambda$ is the transmittance of radiation at wavelength shown in FIG. 3(*a*). The solar modulation ability $\Delta\tau_{sol}$ is defined by the difference of solar transmittance before and after the phase transition, i.e., $$\Delta\tau_{sol} = \tau_{sol}(T<T_c) - \tau_{sol}(T>T_c) \quad (3)$$

According to FIGS. 1-2), the luminous transmittance at low temperature and solar modulation ability are calculated to be ~60% and ~19.1%, respectively.

To perform the simulation for one or more embodiments, the medium office model from the existing buildings category constructed before 1980 ("pre-1980") from the DOE Commercial Reference Buildings was chosen as a virtual test bench for energy simulation analysis. The reference building models were also categorized based on ASHRAE climate zones which represent all U.S. climate zones. The models represent a typical existing medium office building used as a base case to assess the potential improvement in primary energy efficiency by using $VO_2$ film for window retrofitting (FIG. 7).

Figure 7:
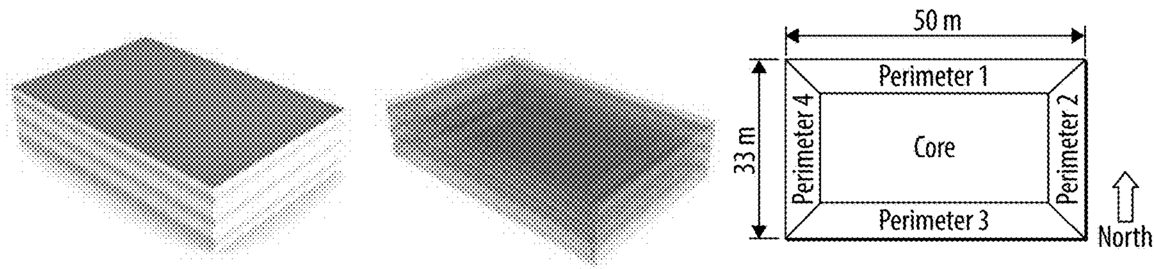
FIG. 7 is an example of a 3D rendering of the of an experimental prototype for a commercial reference building used for experimental analysis, shown at varying opacity and abstraction from left to right.

FIG. 7 shows a 3D rendering of the Medium Office Prototype from DOE Commercial Reference Buildings. The Medium Office is 1660 m2 three-floor building consisting of 15 thermal zones and 3 non-thermal zones. The detailed technical features of the selected model were shown in Table 1.

TABLE 1

Summary of the ASHRAE 90.1 Medium Office model's main features.

| Feature | Value or description |
| --- | --- |
| Total floor area | 4982 $m^2$ |
| Aspect ratio | 1.5 |
| Number of floors | 3 |
| Window-to-wall ratio | 33.0% |
| Thermal zoning | 12 perimeter zones, 3 core zone, 3 plenum zone |
| Floor-to-floor height | 3.96 m |
| Floor-to-ceiling height | 2.74 m |
| Number of occupants | 89 |
| Total glazing area | 652 $m^2$ |
| Fuel types | Natural gas for Heating and Service Water Heater (SWH), Electricity for Cooling |
| Space-heating equipment | Furnace |
| Space-cooling equipment | Packed Air Conditioning Unit (PACU) |
| Internal gains: | |
| Lights | 16.89 $W/m^2$ |
| Electric plug loads | 10.76 $W/m^2$ |
| People | 5.38/100 $m^2$ |

Five fenestration scenarios were implemented in the EnergyPlus Runtime Language. In the first scenario, the fenestrations are 2 mm clear glass single-pane windows, considered as baseline scenario. The properties of the single-pane window were presented in Table 2.

TABLE 2

Present properties of base-case scenario fenestration

| Property | Value |
| --- | --- |
| Solar Transmittance at Normal Incidence | 0.775 |
| Solar Reflectance at Normal Incidence | 0.071 |
| Front and Back Side Infrared Hemispherical Emissivity | 0.84 |
| Conductivity | 1.15 W/m-K |

In the other four scenarios, a $VO_2$ film layer was added to the outer side of the single-pane and was considered as retrofitted case. As described herein, the $VO_2$ film changes its solar transmittance according to its phase transition temperature from the insulating state to the metallic phase. Phase transition temperature in the scenarios include 30, 35, 40 and 68 degrees Celsius. The "Solar Transmittance at Normal Incidence" and the "Solar Reflectance at Normal Incidence" were lab-measured values based on wavelengths which were implemented in the simulation. Properties of fenestration after adding $VO_2$ film were presented in Table 3.

TABLE 3

| Present properties of $VO_2$ film added fenestration | |
|---|---|
| Property | Value |
| Solar Transmittance at Normal Incidence | Lab-measured curve |
| Solar Reflectance at Normal Incidence | Lab-measured curve |
| Front and Back Side Infrared Hemispherical Emissivity | 0.84 |
| Thermal Conductivity | 0.3 W/m-K |

The DOE Medium Office was modeled in EnergyPlus software (version 9.5.0). Heat conduction through an opaque building envelope was calculated via the conduction transfer functions (CTF) using a 10-minute time step. The natural convection heat exchange at surface interfaces were calculated using the thermal analysis research program (TARP) algorithm. The simulation initialization period was set to the maximum selection value at 25 days.

each timestep but before the predictor executes. 'Predictor' refers to the step in EnergyPlus modeling where the zone's thermal loads are calculated." Therefore, the program at each time step of simulation determines the state of the $VO_2$ film for each window based on the surface temperature of the glass of the window.

The mentioned five (5) scenarios were applied in all sixteen (16) models and finally eighty (80) Energy Plus models were generated in IDF format. The generated IDF files were run using the corresponding EPW weather files. The EPW files have been prepared from TMY2 dataset which is based on collecting weather data between 1961 and 1990. Building's cooling and heating energy annual need were recorded as simulation outputs. In the next step, Primary Energy Factors and Emission Factors (e.g., as shown in Table 4), the values of primary energy consumption and the amount of carbon dioxide emissions were calculated and analyzed.

Table 4 presents source energy factors and emission factors, used to calculate the primary energy and emissions from the building's annual site energy consumption across 16 different climate zones in the U.S.

| | $CO_2$ Emission Factors for Fuel Delivered to Building(g/MJ) | | Primary Energy Factor | |
|---|---|---|---|---|
| Climate Zone | Natural Gas | Electricity | Natural Gas | Electricity |
| 1A Miami, Florida | 52.1 | 176.4 | 3.317 | 1.092 |
| 2A Houston, Texas | 52.1 | 232.5 | 3.632 | 1.092 |
| 2B Phoenix, Arizona | 52.1 | 197.2 | 3.163 | 1.092 |
| 3A Atlanta, Georgia | 52.1 | 194.2 | 3.364 | 1.092 |
| 3BLA Los Angeles, California | 52.1 | 221.9 | 3.095 | 1.092 |
| 3BLV Las Vegas, Nevada | 52.1 | 86.67 | 3.577 | 1.092 |
| 3C San Francisco, California | 52.1 | 86.67 | 3.095 | 1.092 |
| 4A Baltimore, Maryland | 52.1 | 168.1 | 3.576 | 1.092 |
| 4B Albuquerque, New Mexico | 52.1 | 264.4 | 3.318 | 1.092 |
| 4C Seattle, Washington | 52.1 | 48.06 | 1.742 | 1.092 |
| 5A Chicago, Illinois | 52.1 | 341.7 | 3.546 | 1.092 |
| 5B Boulder, Colorado | 52.1 | 264.4 | 3.318 | 1.092 |
| 6A Minneapolis, Minnesota | 52.1 | 219.2 | 3.437 | 1.092 |
| 6B Helena, Montana | 52.1 | 236.1 | 3.476 | 1.092 |
| 7A Duluth, Minnesota | 52.1 | 219.2 | 3.437 | 1.092 |
| 8A Fairbanks, Alaska | 52.1 | 195.8 | 3.572 | 1.092 |

Figure 8:
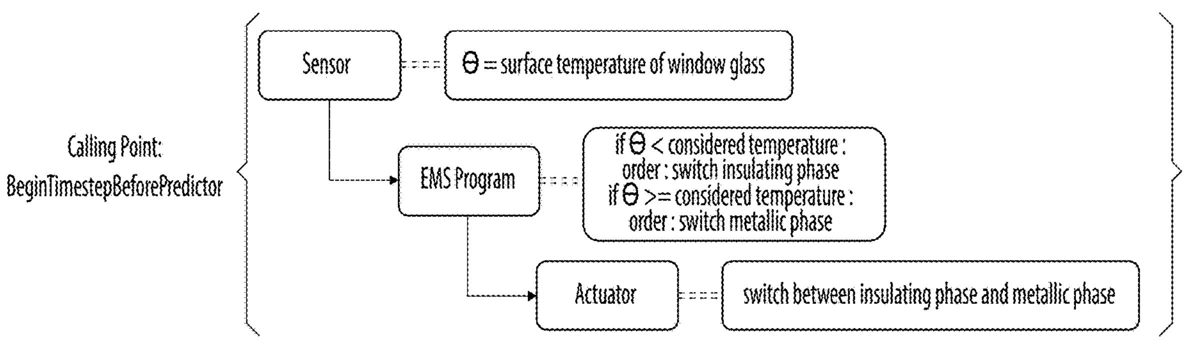
FIG. 8 is a schematic flowchart of an experimental energy management system workflow.

The Energy Management of System (EMS) feature of EnergyPlus was used to implement thermochromic properties of the added layer. As shown in FIG. 8 (which is a schematic of EnergyPlus EMS workflow), there are three main elements in an EMS model: sensor, actuator and program. Sensors (defined by objects in class: EnergyManagementSystem:Sensor) set the value of variable that the actuators (defined by objects in class: EnergyManagementSystem:Actuator) responds to. In this case, the sensor is the surface temperature of windows glass, and the actuator is of the $VO_2$ film. The logic is then defined by EMS program (objects in class: EnergyManagementSystem:Program), where if the surface temperature of the glass is below phase transition temperature, then the $VO_2$ film is in insulating state, and if it is above the phase transition temperature, then $VO_2$ film is in metallic phase. Moreover, the EnergyManagementSystem: ProgramCallingManager object was used to specify when an EMS program has to be ran through the so called calling point. The calling point refers to a specific point of EnergyPlus simulation. The calling point used in the present study for each program is BeginTimestepBeforePredictor. "This calling point happens near the beginning of For the optical simulation, the COMSOL Multiphysics 6.0 software was used to simulate the epoxy encapsulated $VO_2$ embedded PVP nanofiber composite system in accordance with one or more embodiments of the present disclosure. The overall goal of the simulations was to solve for time-harmonic electromagnetic field distributions to calculate the transmittance throughout the system. We used the built-in module Electromagnetic Waves Frequency Domain (EWFD), the governing equation in this module can be written in the form:

$$\nabla \times \left(\frac{1}{\mu_0}\nabla \times E\right) - k_0^2 \epsilon_r E = 0 \quad (4)$$

where $\mu_0$ is the permeability of free space, $\in_r$ is the relative permittivity, and $k_0$ is the wavenumber of free space, defined as:

$$k_0 = \omega\sqrt{\mu_0\epsilon_0} = \frac{\omega}{c_0} \quad (5)$$

where ω is frequency and $c_0$ is speed of light in free space.

Figure 9A:
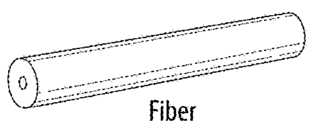
Figure 9B:
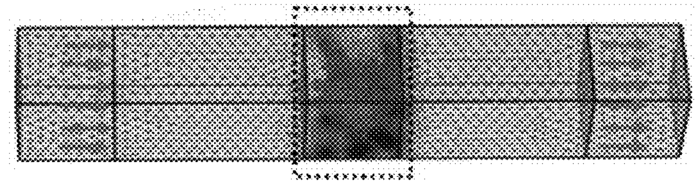
Figure 9C:
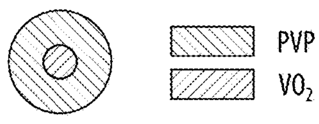

A three-dimensional geometry consist of a box (5 μm×5 μm×5 μm) with randomly oriented nanofibers encapsulated by epoxy on a glass substrate was constructed in COMSOL Multiphysics shown in FIG. 9. FIG. 9 shows a three-dimensional meshed geometry of the simulation setup used in COMSOL in accordance with an experimental example of one or more embodiments of the present disclosure. The randomly oriented fibers were generated in MATLAB code and imported to COMSOL. The maximum filling ratio of fibers to refractive index matching epoxy in the box is around 50%. The diameter of the fiber is fixed at 500 nm and the volume ratio of $VO_2$ in fibers is 18%. In the experimental setup, NFs contain 18% $VO_2$ NPs and 82% PVP. It can be extremely difficult to use randomly oriented NPs in randomly oriented NFs in a simulation setup using the available resources, hence the study first optimized a single PVP fiber containing $VO_2$ nanoparticles and core-shell cylinder keeping the same ratio of $VO_2$ to PVP to get same results. In the final setup the study used randomly oriented core-shell cylindrical fibers to calculate the transmittance.

Embodiments of thermochromic smart windows provided herein can offer the ability to dynamically control the amount of light and heat that enters military vehicles, aircraft, and structures, enhancing both comfort and operational efficiency. This technology can help reduce the need for energy-intensive climate control systems, thus conserving valuable resources and extending mission durations. Additionally, thermochromic smart windows can be integrated into camouflage systems, allowing military vehicles and structures to alter their visual appearance to match their surroundings, enhancing stealth capabilities (i.e. reducing IR irradiation). These windows can also provide protection against laser attacks by quickly darkening upon exposure, safeguarding personnel and sensitive equipment. With their multifaceted benefits, thermochromic smart windows have many military applications, contributing to improved operational effectiveness and soldier safety.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles "a", "an", and "the" as used herein and in the appended claims are used herein to refer to one or to more than one (i.e., to at least one) of the grammatical object of the article unless the context clearly indicates otherwise. By way of example, "an element" means one element or more than one element.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of."

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the apparatus and methods of the subject disclosure have been shown and described, those skilled in the art will readily appreciate that changes and/or modifications may be made thereto without departing from the scope of the subject disclosure.

TABLE a

Potential reduction (italic)/increase (bold) in annual energy use for heating of retrofitting scenario relative to the base-case – kWh/($VO_2$)m2

| | $VO_2$ transition temperature | | | |
|---|---|---|---|---|
| Climate Zone | $T_{MIT}$ = 30° C. | $T_{MIT}$ = 35° C. | $T_{MIT}$ = 40° C. | $T_{MIT}$ = 68° C. |
| 1A Miami, Florida | 0.00 | −0.01 | −0.02 | −0.04 |
| 2A Houston, Texas | 0.05 | *−0.56* | *−0.91* | *−1.63* |
| 2B Phoenix, Arizona | **0.65** | **0.30** | −0.03 | *−0.54* |
| 3A Atlanta, Georgia | **0.71** | *−0.52* | *−1.38* | *−3.11* |
| 3BLA Los Angeles, California | 0.31 | 0.16 | −0.07 | −0.24 |
| 3BLV Las Vegas, Nevada | **1.94** | **1.14** | **0.27** | *−0.72* |
| 3C San Francisco, California | **2.05** | **1.38** | **0.43** | *−0.61* |
| 4A Baltimore, Maryland | **1.50** | *−0.44* | *−1.95* | *−5.38* |
| 4B Albuquerque, New Mexico | **3.75** | **1.99** | *−0.27* | *−2.16* |
| 4C Seattle, Washington | −0.13 | *−0.91* | *−2.25* | *−6.89* |
| 5A Chicago, Illinois | 0.38 | *−0.70* | *−2.91* | *−8.08* |
| 5B Boulder, Colorado | **4.22** | **2.30** | *−1.41* | *−3.63* |
| 6A Minneapolis, Minnesota | −0.63 | *−1.89* | *−4.58* | *−10.51* |
| 6B Helena, Montana | **2.67** | **1.40** | *−2.28* | *−6.94* |
| 7A Duluth, Minnesota | *−3.95* | *−5.12* | *−9.51* | *−14.51* |
| 8A Fairbanks, Alaska | *−16.18* | *−17.16* | *−19.44* | *−27.35* |

TABLE b

Potential reduction (italic)/increase (bold) in annual energy use for cooling of retrofitting scenario relative to the base-case – kWh/($VO_2$)m2

| Climate Zone | $VO_2$ transition temperature | | | |
|---|---|---|---|---|
| | $T_{MIT}$ = 30° C. | $T_{MIT}$ = 35° C. | $T_{MIT}$ = 40° C. | $T_{MIT}$ = 68° C. |
| 1A Miami, Florida | *−26.42* | *−20.49* | *−16.27* | *−10.70* |
| 2A Houston, Texas | *−20.91* | *−16.08* | *−13.01* | *−7.70* |
| 2B Phoenix, Arizona | *−32.03* | *−28.17* | *−23.27* | *−10.96* |
| 3A Atlanta, Georgia | *−17.51* | *−13.48* | *−10.02* | *−5.86* |
| 3BLA Los Angeles, California | *−7.06* | *−5.68* | *−3.66* | −2.63 |
| 3BLV Las Vegas, Nevada | *−24.82* | *−21.87* | *−17.86* | −8.73 |
| 3C San Francisco, California | −3.11 | −2.37 | −1.18 | −1.12 |
| 4A Baltimore, Maryland | *−13.99* | *−11.11* | *−8.55* | *−5.15* |
| 4B Albuquerque, New Mexico | *−13.20* | *−11.02* | *−8.46* | *−4.53* |
| 4C Seattle, Washington | *−2.84* | *−2.38* | *−1.47* | −1.08 |
| 5A Chicago, Illinois | *−10.58* | *−8.54* | *−6.25* | *−4.11* |
| 5B Boulder, Colorado | *−10.79* | *−8.95* | *−6.14* | *−3.67* |
| 6A Minneapolis, Minnesota | *−10.99* | *−8.96* | *−6.44* | *−4.29* |
| 6B Helena, Montana | *−6.96* | *−5.96* | *−4.27* | *−2.52* |
| 7A Duluth, Minnesota | *−6.83* | *−5.47* | *−3.81* | *−2.73* |
| 8A Fairbanks, Alaska | *−5.80* | *−4.71* | *−3.59* | *−2.42* |

TABLE c

Potential reduction (italic)/increase (bold) in annual primary energy use of retrofitting scenario in compare to the base-case – kWh/($VO_2$)m2

| Climate Zone | $VO_2$ transition temperature | | | |
|---|---|---|---|---|
| | $T_{MIT}$ = 30° C. | $T_{MIT}$ = 35° C. | $T_{MIT}$ = 40° C. | $T_{MIT}$ = 68° C. |
| 1A Miami, Florida | *−87.64* | *−67.99* | *−53.99* | *−35.52* |
| 2A Houston, Texas | *−75.88* | *−59.02* | *−48.25* | *−29.74* |
| 2B Phoenix, Arizona | *−100.60* | *−88.77* | *−73.64* | *−35.26* |
| 3A Atlanta, Georgia | *−58.12* | *−45.91* | *−35.21* | *−23.11* |
| 3BLA Los Angeles, California | *−21.51* | *−17.41* | *−11.42* | *−8.40* |
| 3BLV Las Vegas, Nevada | *−86.68* | *−76.99* | *−63.58* | *−32.01* |
| 3C San Francisco, California | −7.39 | −5.82 | −3.17 | *−4.14* |
| 4A Baltimore, Maryland | *−48.41* | *−40.19* | *−32.70* | *−24.31* |
| 4B Albuquerque, New Mexico | *−39.69* | *−34.40* | *−28.38* | *−17.38* |
| 4C Seattle, Washington | −5.09 | −5.14 | *−5.02* | *−9.39* |
| 5A Chicago, Illinois | *−37.12* | *−31.03* | *−25.32* | *−23.38* |
| 5B Boulder, Colorado | *−31.19* | *−27.20* | *−21.92* | *−16.16* |
| 6A Minneapolis, Minnesota | *−38.47* | *−32.87* | *−27.13* | *−26.21* |
| 6B Helena, Montana | *−21.29* | *−19.18* | *−17.35* | *−16.33* |
| 7A Duluth, Minnesota | *−27.79* | *−24.37* | *−23.47* | *−25.25* |
| 8A Fairbanks, Alaska | *−38.38* | *−35.56* | *−34.05* | *−38.52* |

TABLE d

Potential reduction (blue)/increase (orange) in annual carbon emission of retrofitting scenario in compare to the base-case – kg/($VO_2$)m2

| Climate Zone | $VO_2$ transition temperature | | | |
|---|---|---|---|---|
| | $T_{MIT}$ = 30° C. | $T_{MIT}$ = 35° C. | $T_{MIT}$ = 40° C. | $T_{MIT}$ = 68° C. |
| 1A Miami, Florida | −16.78 | −13.02 | −10.34 | −6.80 |
| 2A Houston, Texas | −17.49 | −13.56 | −11.06 | −6.75 |
| 2B Phoenix, Arizona | −22.62 | −19.94 | −16.53 | −7.88 |
| 3A Atlanta, Georgia | −12.11 | −9.52 | −7.26 | −4.68 |
| 3BLA Los Angeles, California | −2.14 | −1.74 | −1.16 | −0.87 |
| 3BLV Las Vegas, Nevada | −19.47 | −17.26 | −14.21 | −7.11 |
| 3C San Francisco, California | −0.59 | −0.48 | −0.29 | −0.46 |
| 4A Baltimore, Maryland | −8.19 | −6.80 | −5.54 | −4.13 |
| 4B Albuquerque, New Mexico | −11.86 | −10.12 | −8.11 | −4.72 |
| 4C Seattle, Washington | −0.52 | −0.58 | −0.68 | −1.48 |
| 5A Chicago, Illinois | −12.95 | −10.63 | −8.23 | −6.57 |
| 5B Boulder, Colorado | −9.48 | −8.09 | −6.11 | −4.18 |
| 6A Minneapolis, Minnesota | −8.79 | −7.43 | −5.94 | −5.35 |
| 6B Helena, Montana | −5.42 | −4.80 | −4.06 | −3.44 |
| 7A Duluth, Minnesota | −6.13 | −5.27 | −4.79 | −4.88 |
| 8A Fairbanks, Alaska | −7.12 | −6.54 | −6.18 | −6.84 |

What is claimed is:

1. A thermochromic window, comprising:

a thermochromic fiber layer configured to block or permit transmission of electromagnetic radiation through the thermochromic fiber layer as a function of a temperature of the thermochromic fiber layer wherein the thermochromic fiber layer includes an electrospun nanofiber mat comprised of $VO_2$ nanoparticles, wherein the thermochromic fiber layer further includes a matrix formed from a polymer and a solvent, wherein the polymer includes one of polyvinylpyrrolidone (PVP), polyvinyl butyral (PVB), polyethylene oxide (PEO), or polyvinyl alcohol (PVA), wherein the matrix includes about 1% by weight $VO_2$ nanoparticles relative to polymer, about 19% by weight polymer relative to solvent, and about 80% by weight solvent.

2. The window of claim 1, comprising a first transparent layer and a second transparent layer, wherein the thermochromic fiber layer is sandwiched between the first transparent layer and the second transparent layer or embedded in the second transparent layer to immobilize the thermochromic fiber layer.

3. The window of claim 2, wherein the second transparent layer includes an epoxy layer.

4. The window of claim 3, wherein the second transparent layer includes a highly cross-linked epoxy.

5. The window of claim 2, wherein a refractive index of the thermochromic fiber layer substantially matches a refractive index of the second transparent layer.

6. The window of claim 1, wherein the solvent includes one of ethanol, water, or anisole.

7. The window of claim 6, wherein the $VO_2$ nanoparticles included in the electrospun nanofiber mat are embedded in the polymer.

8. The window of claim 1, comprising:

a transparent glass layer;

the thermochromic fiber layer disposed on the transparent glass layer; and a transparent resin layer disposed on the thermochromic fiber layer configured to immobilize the $VO_2$ nanoparticles between the transparent glass layer and the resin layer.

9. A method for manufacturing the thermochromic window of claim 1, comprising:

forming an electrospun thermochromic coating having a uniform opacity to form the thermochromic fiber layer.

10. The method of claim 9, wherein forming further comprises:

preparing a solution of a polymer, a solvent, and the $VO_2$ nanoparticles;

electrospinning the thermochromic coating to form the electrospun nanofiber mat formed from the polymer and the $VO_2$ nanoparticles to embed the $VO_2$ nanoparticles within the polymer and immobilize the $VO_2$ nanoparticles in the electrospun nanofiber mat.

11. The method of claim 10, wherein the electrospun nanofiber mat of the thermochromic coating is electrospun directly onto a transparent glass layer.

12. The method of claim 11, further comprising, forming an epoxy layer on the window to sandwich the electrospun nanofiber mat of the thermochromic coating between the transparent glass layer and the epoxy layer.

13. The method of claim 11, further comprising, thermally cross-linking the thermochromic coating after electrospinning.

14. The method of claim 13, wherein electrospinning occurs for up to 24 hours.

* * * * *